United States Patent
Angelov

(10) Patent No.: US 11,422,693 B2
(45) Date of Patent: *Aug. 23, 2022

(54) DIGITAL INK GENERATING APPARATUS, METHOD AND PROGRAM, AND DIGITAL INK REPRODUCING APPARATUS, METHOD AND PROGRAM

(71) Applicant: Wacom Co., Ltd., Saitama (JP)

(72) Inventor: Branimir Angelov, Sofia (BG)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,711

(22) Filed: Jul. 6, 2020

(65) Prior Publication Data

US 2020/0333952 A1 Oct. 22, 2020

Related U.S. Application Data

(63) Continuation of application No. 14/919,573, filed on Oct. 21, 2015, now Pat. No. 10,747,421, which is a
(Continued)

(51) Int. Cl.
*G06F 3/0488* (2022.01)
*G06F 3/04883* (2022.01)
(Continued)

(52) U.S. Cl.
CPC ...... *G06F 3/04883* (2013.01); *G06F 3/03545* (2013.01); *G06F 3/0414* (2013.01);
(Continued)

(58) Field of Classification Search
CPC ............ G06F 3/04883; G06F 3/03545; G06F 3/0414; G06F 3/04812; G06F 3/04845;
(Continued)

(56) References Cited

U.S. PATENT DOCUMENTS 6,384,851 B1 5/2002 Takasu et al.
6,474,888 B1 * 11/2002 Lapstun ............... B41J 2/17503
178/79
(Continued)

FOREIGN PATENT DOCUMENTS

JP 6-222879 A 8/1994
JP 8-320756 A 12/1996
(Continued)

OTHER PUBLICATIONS

Ausbrooks et al., "Mathematical Markup Language (MathML) Version 2.0 (Second Edition)," W3C Recommendation, Oct. 21, 2003, 8 pages.
(Continued)

*Primary Examiner* — Alexander Eisen
*Assistant Examiner* — Cory A Almeida
(74) *Attorney, Agent, or Firm* — Seed IP Law Group LLP

(57) ABSTRACT

A digital ink generating apparatus is disclosed, which includes: a stroke data generator which, in operation, generates stroke data associated with an input sensor attribute based on pen event data generated by an input sensor when an indicator is operated, a mapping data generator which, in operation, generates mapping data indicative of a transform rule for transforming a value of the input sensor attribute included in the stroke data to a value of one of line width and transparency, and a digital ink assembler which, in operation, outputs, in a determined data format, a digital ink including the stroke data and the mapping data.

15 Claims, 18 Drawing Sheets

Related U.S. Application Data continuation of application No. PCT/JP2014/083506, filed on Dec. 18, 2014.

(51) Int. Cl.

| | | |
|---|---|---|
| *G06F 40/109* | (2020.01) | |
| *G06F 40/171* | (2020.01) | |
| *G06F 3/041* | (2006.01) | |
| *G06F 3/0354* | (2013.01) | |
| *G06F 3/04812* | (2022.01) | |
| *G06F 3/04845* | (2022.01) | |
| *G06V 30/32* | (2022.01) | |
| *G06V 30/142* | (2022.01) | |

(52) U.S. Cl.
CPC ...... *G06F 3/04812* (2013.01); *G06F 3/04845* (2013.01); *G06F 40/109* (2020.01); *G06F 40/171* (2020.01); *G06F 2203/04804* (2013.01); *G06V 30/1423* (2022.01); *G06V 30/333* (2022.01)

(58) Field of Classification Search
CPC .... G06F 40/109; G06F 40/171; G06F 17/242; G06K 9/00409; G06K 9/222
See application file for complete search history.

(56) References Cited

U.S. PATENT DOCUMENTS

| | | | |
|---|---|---|---|
| 7,158,675 | B2 | 1/2007 | Gounares et al. |
| 7,167,585 | B2 | 1/2007 | Gounares et al. |
| 7,715,630 | B2 | 5/2010 | Gounares et al. |
| 8,947,386 | B2 | 2/2015 | Shibata et al. |
| 2003/0215140 | A1 | 11/2003 | Gounares et al. |
| 2004/0085286 | A1 | 5/2004 | Wang et al. |
| 2005/0057535 | A1 | 3/2005 | Liu et al. |
| 2006/0093218 | A1 | 5/2006 | Gounares et al. |
| 2006/0093219 | A1 | 5/2006 | Gounares et al. |
| 2007/0139399 | A1* | 6/2007 | Cook ................ G06F 3/03545 345/179 |
| 2007/0234878 | A1 | 10/2007 | Worrall et al. |
| 2008/0278734 | A1 | 11/2008 | Erikson et al. |
| 2012/0139863 | A1 | 6/2012 | Lee |
| 2013/0050111 | A1 | 2/2013 | Shibata et al. |
| 2013/0229332 | A1* | 9/2013 | Barrus ................ G06K 9/2081 345/156 |
| 2014/0340318 | A1 | 11/2014 | Stringer |
| 2014/0344720 | A1 | 11/2014 | Kumashio |
| 2014/0344731 | A1 | 11/2014 | Holz |
| 2015/0154444 | A1 | 6/2015 | Kurita |

FOREIGN PATENT DOCUMENTS

| | | | |
|---|---|---|---|
| JP | 2003-330605 A | | 11/2003 |
| JP | 2013-45362 A | | 3/2013 |
| JP | 2013-137696 A | | 7/2013 |
| JP | 2013137696 A | * | 7/2013 |
| JP | 2014-225188 A | | 12/2014 |
| WO | 2014/147716 | | 9/2014 |

OTHER PUBLICATIONS

Chee et al., "Ink Markup Language (InkML)," W3C Recommendation, Sep. 20, 2011, 49 pages.
Dahlstroem et al., "Scalable Vector Graphics (SVG) 1.1 (Second Edition)," W3C Recommendation, Aug. 16, 2011, 4 pages.
Extended European Search Report, dated Jul. 19, 2017, for European Application No. 14908428.7-1507 / 3079052, 9 pages.
Hickson et al., "A vocabulary and associated APIs for HTML and XHTML," W3C Recommendation, Oct. 28, 2014, 22 pages.
International Search Report dated Feb. 10, 2015, for corresponding International Application No. PCT/JP2014/083506, 3 pages.
International Written Opinion dated Feb. 10, 2015, for corresponding International Application No. PCT/JP2014/083506, 3 pages.
Mestetskii, "Fat Curves and Representation of Planar Figures," Department of Information Technologies, Computers & Graphics 24 (2000), Tver' State University, Tver, Russia, 32 pages.
Microsoft Corporation, "Ink Serialized Format Specification," 2007, 49 pages.

\* cited by examiner

FIG. 4

```
<trace xml:id="sd0">
14 21 1.0, 13 33 1.0, 13 64 0.9, 13 91 0.9, 12 120 0.9, 12 152 0.8, 12 176 0.8, 13 207 0.7,
15 238 0.8, 15 268 0.7, 16 301 0.8, 16 334 0.7, 16 374 0.7, 13 414 0.6, 10 385 0.6, 12 351 0.6,
18 318 0.7, 25 288 0.7, 37 257 0.7, 51 231 0.9, 73 217 0.7, 98 237 0.7, 111 268 0.7, 118 297 0.6,
120 331 0.6, 119 373 0.5
</trace>

<trace xml:id="sd1">
199 306 1.0, 227 305 1.0, 247 290 0.9, 262 270 0.9, 269 239 0.9, 242 220 0.8, 210 235 0.8,
189 260 0.7, 175 280 0.8, 168 322 0.7, 167 357 0.8, 174 389 0.7, 199 410 0.7, 239 400 0.6,
280 366 0.6
</trace>

<trace xml:id="sd2">
367 309 0.7, 379 275 0.7, 387 246 0.8, 396 211 0.9, 402 174 0.8, 408 139 0.9, 410 102 0.8,
400 68 0.7, 380 93 0.8, 370 124 0.7, 360 162 0.8, 354 202 0.7, 345 247 0.7, 343 284 0.6,
340 321 0.6, 342 359 0.6, 354 396 0.7, 382 404 0.7, 411 388 0.7, 444 359 0.5
</trace>

<trace xml:id="sd3">
489 290 0.7, 502 260 0.7, 510 217 0.8, 518 175 0.9, 523 138 0.8, 530 100 0.9, 531 62 0.8,
522 32 0.7, 504 64 0.8, 493 101 0.7, 482 145 0.8, 474 193 0.7, 466 238 0.7, 461 280 0.6,
457 337 0.6, 471 386 0.6, 511 373 0.7, 543 347 0.7
</trace>

<trace xml:id="sd4">
615 227 0.7, 604 260 0.7, 602 292 0.8, 617 329 0.9, 648 344 0.8, 674 328 0.9,
690 297 0.8, 689 258 0.7, 660 247 0.8
</trace>
```

```
              SD1
        ┌─────┴─────┐
        │ <trace>            │
PD0 ────┼─ 199 306 1.0,      │
PD1 ────┼─ 227 305 1.0,      │
PD2 ────┼─ 247 290 0.9,      │
PD3 ────┼─ 262 270 0.9,      │
PD4 ────┼─ 269 239 0.9,      │
PD5 ────┼─ 242 220 0.8,      │
PD6 ────┼─ 210 235 0.8,      │
PD7 ────┼─ 189 260 0.7,      │
PD8 ────┼─ 175 290 0.8,      │
PD9 ────┼─ 168 322 0.7,      │
PD10────┼─ 167 357 0.8,      │
PD11────┼─ 174 389 0.7,      │
PD12────┼─ 199 410 0.7,      │
PD13────┼─ 239 400 0.6,      │
PD14────┼─ 280 366 0.6       │
        │ </trace>           │
        └────────────────────┘
```

FIG.6

INKD

```
<?xml version="1.0"encoding="UTF-8"?>
<ink xmlns="http://www.w3.org/2003/InkML">
```

DEFINITION BLOCK DEB

`<definitions>`

MAPPING DATA DESCRIPTION BLOCK MDB

`<canvasTransform>`

| `<mapping>` | MD1 | `</mapping>` |
| `<mapping>` | MD2 | `</mapping>` |

⋮

`</canvasTransform>`

DRAWING STYLE DATA DESCRIPTION BLOCK DDB

| DD1 |
| DD2 |

⋮

`</definitions>`

STROKE DATA DESCRIPTION BLOCK SDB

| `<trace>` | SD0 | `</trace>` |
| `<trace>` | SD1 | `</trace>` |

⋮

| `<trace>` | SD4 | `</trace>` |

⋮

`</ink>`

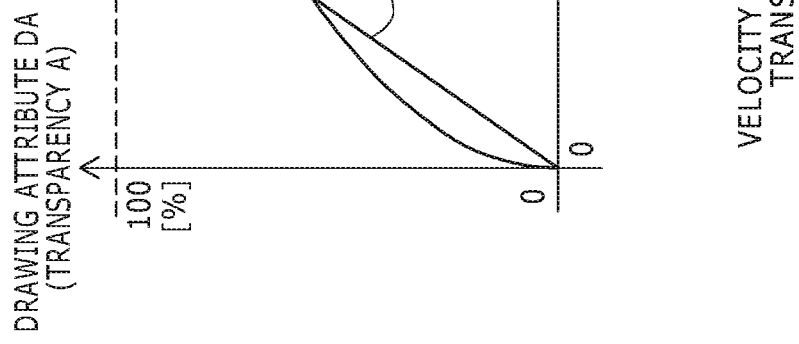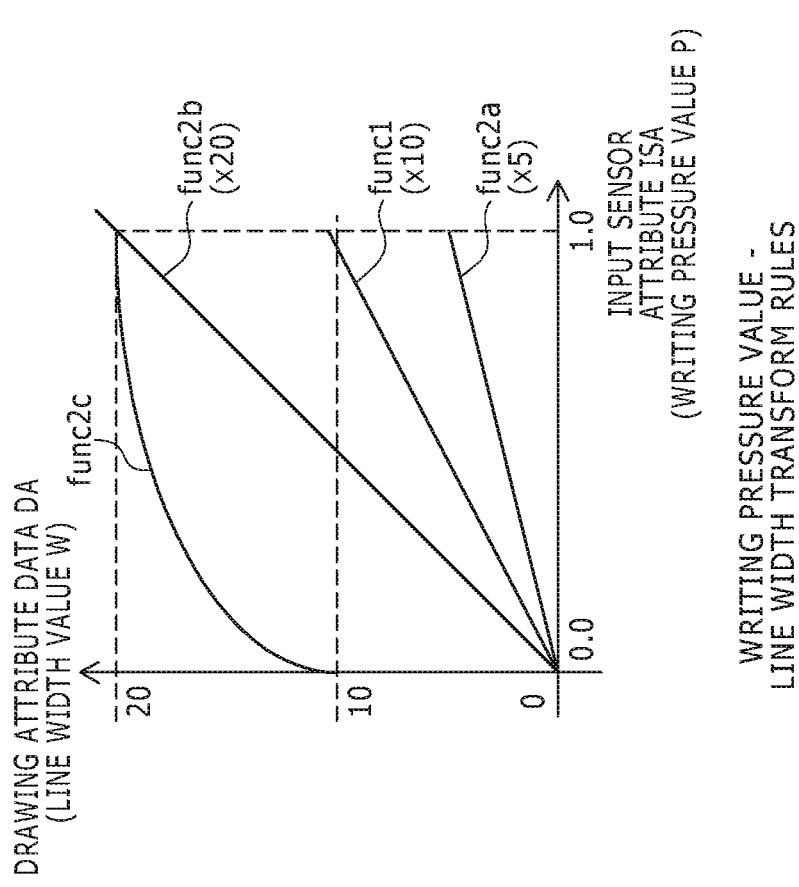

FIG.8

```
01  <canvasTransform xml:id="CT0">
02      <mapping xml:id="md1" type="product">
03          <mapping type="mathml">
04              <bind target="W" />
05              <bind source="P" variable="p"/>
06              <math xmlns="http://www.w3.org/1998/Math/MathML">
07                  <apply>
08                      <times/>
09                      <ci>p</ci>           — func1
10                      <cn>10</cn>
11                  </apply>
12              </math>
13          </mapping>
14      </mapping>
15
16      <mapping xml:id="md2" type="product">
17          <mapping type="mathml" range = "-2, -1" >
18              <bind target="W" />               rd
19              <bind source="P" variable="p"/>
20              <math xmlns="http://www.w3.org/1998/Math/MathML">
21                  <apply>
22                      <times/>
23                      <ci>p</ci>           — func2a
24                      <cn>5</cn>
25                  </apply>
26              </math>
27          </mapping>
28      </mapping>
29
30  </canvasTransform>
```

— MD1

— MDB

— MD2

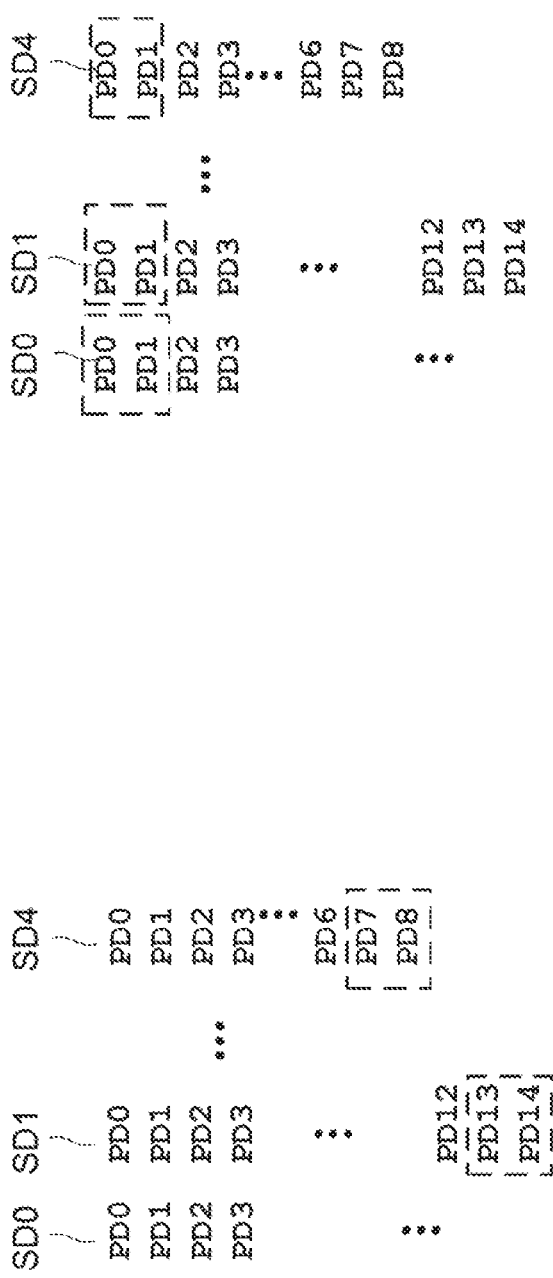

FIG.9C
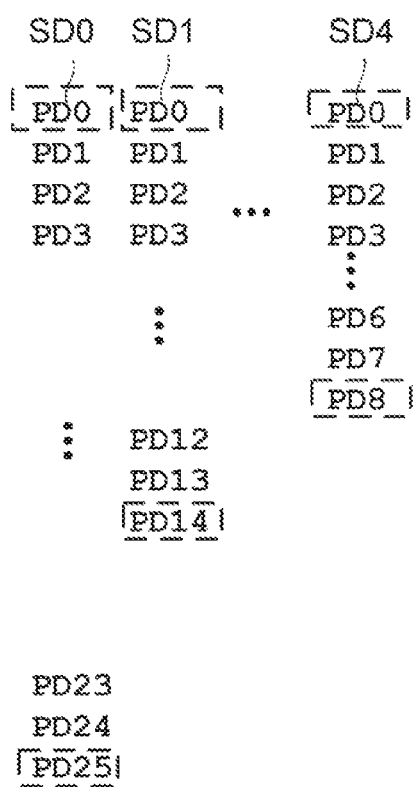
range = " -1, 0"
FIG.9D
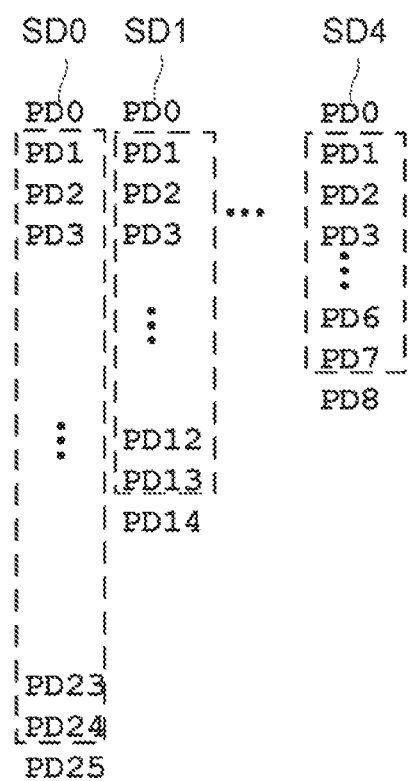
range = " 1, -2"
FIG.10
```
01    <brush xml:id="Brush0">
02        <brushProperty name="color" value="#000000" />
03        <brushProperty name="eraseMethod" value="null" />
04        <brushProperty name="shape" value="round" />
05        <brushProperty name="type" value="regular" />
06    </brush>
```
DD1

FIG. 11A

| | INPUT SENSOR ATTRIBUTE ISA | | |
|---|---|---|---|
| | FIRST ATTRIBUTE X | SECOND ATTRIBUTE Y | THIRD ATTRIBUTE P |
| PD0 | 199 | 306 | 1.0 |
| PD1 | 227 | 305 | 1.0 |
| PD2 | 247 | 290 | 0.9 |
| PD3 | 262 | 270 | 0.9 |
| PD4 | 269 | 239 | 0.9 |
| PD5 | 242 | 220 | 0.8 |
| PD6 | 210 | 235 | 0.8 |
| PD7 | 189 | 260 | 0.7 |
| PD8 | 175 | 290 | 0.8 |
| PD9 | 168 | 322 | 0.7 |
| PD10 | 167 | 357 | 0.8 |
| PD11 | 174 | 389 | 0.7 |
| PD12 | 199 | 410 | 0.7 |
| PD13 | 239 | 400 | 0.6 |
| PD14 | 280 | 366 | 0.6 |

STROKE DATA SD1 BEFORE CONVERSION

FIG. 11B

| INPUT SENSOR ATTRIBUTE ISA | | | DRAWING ATTRIBUTE DA |
|---|---|---|---|
| FIRST ATTRIBUTE X | SECOND ATTRIBUTE Y | THIRD ATTRIBUTE P | FOURTH ATTRIBUTE W |
| 199 | 306 | 1.0 | 10 |
| 227 | 305 | 1.0 | 10 |
| 247 | 290 | 0.9 | 9 |
| 262 | 270 | 0.9 | 9 |
| 269 | 239 | 0.9 | 9 |
| 242 | 220 | 0.8 | 8 |
| 210 | 235 | 0.8 | 8 |
| 189 | 260 | 0.7 | 7 |
| 175 | 290 | 0.8 | 8 |
| 168 | 322 | 0.7 | 7 |
| 167 | 357 | 0.8 | 8 |
| 174 | 389 | 0.7 | 7 |
| 199 | 410 | 0.7 | 7 |
| 239 | 400 | 0.6 | 6 |
| 280 | 366 | 0.6 | 6 | rd1

STROKE DATA SD1 AFTER MD1 APPLICATION

FIG. 11C

| INPUT SENSOR ATTRIBUTE ISA | | | DRAWING ATTRIBUTE DA |
|---|---|---|---|
| FIRST ATTRIBUTE X | SECOND ATTRIBUTE Y | THIRD ATTRIBUTE P | FOURTH ATTRIBUTE W |
| 199 | 306 | 1.0 | 10 |
| 227 | 305 | 1.0 | 10 |
| 247 | 290 | 0.9 | 9 |
| 262 | 270 | 0.9 | 9 |
| 269 | 239 | 0.9 | 9 |
| 242 | 220 | 0.8 | 8 |
| 210 | 235 | 0.8 | 8 |
| 189 | 260 | 0.7 | 7 |
| 175 | 290 | 0.8 | 8 |
| 168 | 322 | 0.7 | 7 |
| 167 | 357 | 0.8 | 8 |
| 174 | 389 | 0.7 | 7 |
| 199 | 410 | 0.7 | 7 |
| 239 | 400 | 0.6 | 6 |
| 280 | 366 | 0.6 | 3 | rd2

STROKE DATA SD1 AFTER MD2 APPLICATION range = " -1, 0"

```
                    SD5
        ┌─ ─ ─ ─ ─ ─ ─ ─ ─ ─ ┐
        |      <trace>       |
  PD0 ──┼──    0    0    '0, |
  PD1 ──┼──    8    0    '16,|
  PD2 ──┼──   24    0    '32,|
  PD3 ──┼──   48    0    '48,|
  PD4 ──┼──   80    0    '64,|
  PD5 ──┼── 120     0    '80,|
  PD6 ──┼── 162     0    '96,|
  PD7 ──┼── 224     0   '112,|
  PD8 ──┼── 288     0   '128,|
  PD9 ──┼── 360     0   '144 |
        |     </trace>       |
        └─ ─ ─ ─ ─ ─ ─ ─ ─ ─ ┘
```

FIG. 16A

| | INPUT SENSOR ATTRIBUTE ISA | | |
|---|---|---|---|
| | FIRST ATTRIBUTE X | SECOND ATTRIBUTE Y | THIRD ATTRIBUTE T |
| PD0 | 0 | 0 | 0 |
| PD1 | 8 | 0 | 16 |
| PD2 | 24 | 0 | 32 |
| PD3 | 48 | 0 | 48 |
| PD4 | 80 | 0 | 64 |
| PD5 | 120 | 0 | 80 |
| PD6 | 162 | 0 | 96 |
| PD7 | 224 | 0 | 112 |
| PD8 | 288 | 0 | 128 |
| PD9 | 360 | 0 | 144 |

STROKE DATA SD5

FIG. 16B

| INPUT SENSOR ATTRIBUTE ISA | | | | DRAWING ATTRIBUTE DA (TRANSPARENCY A) |
|---|---|---|---|---|
| FIRST ATTRIBUTE X | SECOND ATTRIBUTE Y | THIRD ATTRIBUTE T | | FOURTH ATTRIBUTE A |
| 0 | 0 | 0 | | 10 |
| 8 | 0 | 16 | | 10 |
| 24 | 0 | 32 | | 20 |
| 48 | 0 | 48 | | 30 |
| 80 | 0 | 64 | | 40 |
| 120 | 0 | 80 | | 50 |
| 162 | 0 | 96 | | 60 |
| 224 | 0 | 112 | | 70 |
| 288 | 0 | 128 | | 80 |
| 360 | 0 | 144 | | 90 |

STROKE DATA SD5 AFTER MD3 APPLICATION

FIG. 16C

| INPUT SENSOR ATTRIBUTE ISA | | | | DRAWING ATTRIBUTE DA (TRANSPARENCY A) |
|---|---|---|---|---|
| FIRST ATTRIBUTE X | SECOND ATTRIBUTE Y | THIRD ATTRIBUTE T | | FOURTH ATTRIBUTE A |
| 0 | 0 | 0 | | (0) |
| 8 | 0 | 16 | | (0) |
| 24 | 0 | 32 | | (0) |
| 48 | 0 | 48 | | (0) |
| 80 | 0 | 64 | | (0) |
| 120 | 0 | 80 | | (0) |
| 162 | 0 | 96 | | (0) |
| 224 | 0 | 112 | | 70 |
| 288 | 0 | 128 | | 80 |
| 360 | 0 | 144 | | 90 |

STROKE DATA SD5 AFTER MD3 APPLICATION TO RANGE PART "-3, -1"

FIG.17A
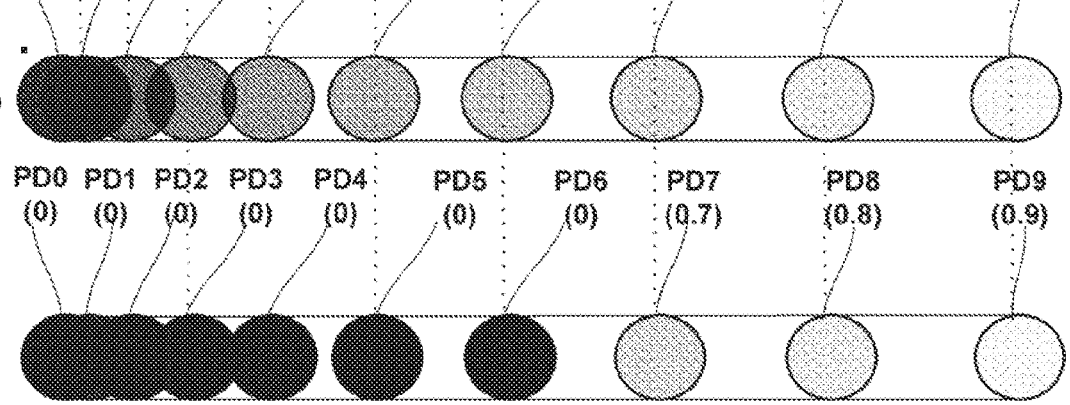
FIG. 17B
FIG.17C
FIG.18
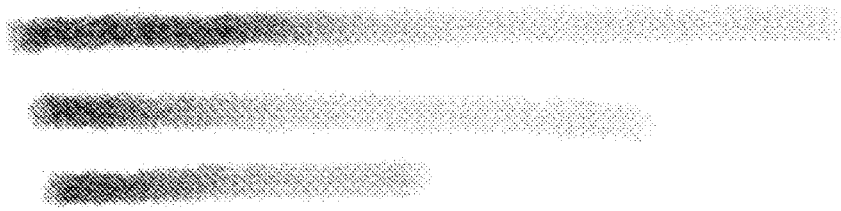
FIG.19A (PRIOR ART)
```
01:<mapping xml:id="m01" type="affine">
02:    <bind source="X" column="1"/>
03:    <bind source="Y" column="2"/>
04:    <affine>
05:       0 -1   0,
06:       1  0 200,
07:    </affine>
08:</mapping>
```

FIG. 19B (PRIOR ART)

```
01: <mapping type="product">
02:   <mapping type="mathml">
03:     <bind target="X"/>
04:     <bind source="VR" variable="r"/>
05:     <bind source="Vth" variable="theta"/>
06:     <math xmlns="http://www.w3.org/1998/Math/MathML">
07:       <apply>
08:         <times/>
09:         <ci>r</ci>
10:         <apply> <cos/> <ci>theta</ci> </apply>
11:       </apply>
12:     </math>
13:   </mapping>
14:   <mapping type="mathml">
15:     <bind target="y"/>
16:     <bind source="VR" variable="r"/>
17:     <bind source="Vth" variable="theta"/>
18:     <math xmlns="http://www.w3.org/1998/Math/MathML">
19:       <apply>
20:         <times/>
21:         <ci>r</ci>
22:         <apply> <sin/> <ci>theta</ci> </apply>
23:       </apply>
24:     </math>
25:   </mapping>
26: </mapping>
```

MD_X: lines 02–13
MD_Y: lines 14–25

DIGITAL INK GENERATING APPARATUS, METHOD AND PROGRAM, AND DIGITAL INK REPRODUCING APPARATUS, METHOD AND PROGRAM

BACKGROUND OF THE INVENTION

1. Field of the Invention

The present invention relates to a digital ink generating apparatus, a digital ink generating method, and a digital ink reproducing apparatus and, more particularly, to a digital ink generating apparatus and a digital ink generating method configured to generate a digital ink on the basis of event data that is generated when a pen is operated and a digital ink reproducing apparatus configured to reproduce the digital ink thus generated.

2. Description of the Related Art

Moving a pen filled with ink or a brush applied with paint on a piece of paper has ink or paint absorbed in the paper or deposited thereon, thereby drawing a trace.

Digital ink is data obtained by putting a trace (or a stroke) into electronic data, the trace being left by moving an indicator such as an electronic pen or a stylus on a position detection device such as a tablet as if simulating a handwritten trace drawn on a piece of paper. Digital ink is configured by normally including (1) data for reproducing a handwritten trace, (2) data for describing a drawing style of a trace, and (3) data for describing transform rules for transforming data related with a trace. Digital ink has data formats standardized for use in different environments, such as drawing applications and documentation applications that operate under the control of various OS's, which is disclosed in Yi-Min Chee and 11 others, "Ink Markup Language (InkML) W3C Recommendation 20 Sep. 2011," [online], Sep. 20, 2011, W3C [Searched on Nov. 19, 2014], Internet <URL: http://www.w3.org/TR/InkML/>; "Ink Serialized Format Specification," [online], Microsoft Corporation, [Searched on Dec. 11, 2014], Internet <URL: http://download.microsoft.com/download/0/B/E/0BE8BDD7-E5E8-422A-ABFD-4342ED7AD886/InkSerializedFormat(ISF)Specification.pdf>; Erik Dahlstrom, and 9 others, "Scalable Vector Graphics (SVG) 1.1 (Second Edition) W3C Recommendation 16 Aug. 2011," [online], Aug. 16, 2011, W3C, [Searched on Dec. 11, 2014], Internet <URL: http://www.w3.org/TR/SVG/>; and Ian Hickson, and 6 others, "A vocabulary and associated APIs for HTML and XHTML W3C Recommendation 28 Oct. 2014," [online], Oct. 28, 2014, W3C, [Searched on Dec. 11, 2014], Internet <URL: http://www.w3.org/TR/htm15/> (Non-Patent Documents 1, 2, 3 and 4, respectively).

InkML described in Non-Patent Document 1 is one of the most popular data formats of digital ink. (1) Data for reproducing a handwritten trace is called a <trace> element. The <trace> element describes a set of two or more pieces of point data (data detected by an input sensor at a predetermined time interval and including data indicative of input-sensor-dependent attributes (input sensor attributes), such as coordinate data (X, Y), writing pressure data P, and time data T) making up a trace of one stroke (an operation done from touching of an indicator onto the sensor surface of a position detection apparatus to removing this indicator from the sensor surface). In addition, InkML specifies (2) data such as a <brush> element, for example, as data for specifying a trace drawing style and (3) data such as a <mapping> element to be described later, as data for describing transform rules for data related with traces.

ISF (Ink Serialized Format) described in Non-Patent Document 2 is a data format of digital ink for use in applications of Microsoft Corporation. (1) A data block for reproducing a handwritten trace is referred to as StrokeDescriptorBlock. The StrokeDescriptorBlock describes points (X, Y coordinate values) for reproducing a stroke trace and a writing pressure value, for example. In addition, (2) DrawingAttributeBlock that is a block for describing a drawing style and (3) TransformBlock that is a block for describing transform rules of data related with traces are specified.

SVG described in Non-Patent Document 3 is a markup language for describing a two-dimensional graphics application and a set of image and graphics script. (1) There is a <path> element as data for reproducing a handwritten trace. The <path> element includes two or more control points (point data) and a trace is reproduced by a Bezier curve based on these control points.

In addition, HTML5 described in Non-Patent Document 4 specifies (1) a data type called CanvasPath class as data for reproducing a handwritten trace.

In the following, the <trace> of Non-Patent Document 1, the StrokeDescriptorBlock of Non-Patent Document 2, the <path> element of Non-Patent Document 3, and the CanvasPath in HTML5 of Non-Patent Document 4 are generically referred to as stroke data that is vector data for reproducing shapes including traces and line widths handwritten by use of an input apparatus.

Further, in what follows, the data for describing transform rules of the data (stroke data) related with traces, such as the <mapping> of Non-Patent Document 1 and the <TransformBlock> of Non-Patent Document 2 are generically referred to as mapping data.

Now, referring to FIG. 19A, there is shown a diagram illustrating a <mapping> element that is mapping data described in Non-Patent Document 1. This example shows a transform rule that uses "affine" as the type of <mapping> element. This transform rule shows a transform that executes, on a graphic specified by X coordinate and Y coordinate, affine transform (the graphic is executed with transform of 90-degree rotation and then translated by 200 in Y direction) shown in row 4 to row 7.

Referring to FIG. 19B, there is shown a diagram illustrating a transform rule with "mathml" used as the type of <mapping> element. The transform rule using "mathml" allows the use of mathematic operations corresponding to "root," "cos," "minus," and other expressions reserved in a name space specified by MathML2 disclosed in Ron Ausbrooks, and 15 others, "Mathematical Markup Language (MathML) Version 2.0 (Second Edition) W3C Recommendation 21 Oct. 2003," [online], Oct. 21, 2003, W3C, [Searched on Dec. 11, 2014], Internet <URL: http://www.w3.org/TR/MathML2/> (Non-Patent Document 5). The transform rule shown in the example of FIG. 19B is one by which coordinate data (VR, VTh) of an input sensor attribute indicated by a polar coordinate format is transformed to coordinate data (X, Y) indicated by an orthogonal coordinate format. In the figure, a transform rule indicated by a dashed line frame MD_X in the line 2 through the line 13 describes a transform rule for deriving new X coordinate data by use of a cosine and so on specified by "cos" by a value of diameter VR (variable r), a value of angle VTh (variable theta), and MathML indicated by input sensor attributes. A transform rule indicated by MD_Y in the line 14 through the line 25 is indicative of a transform rule for obtaining new Y coordinate data.

ISF of Non-Patent Document 2 lists variations available as transform rules as a type of <TRANSFORM BLOCK> (page 10). A transform matrix that can be expressed by two rows and three columns made up of elements M11, M12, M21, M22, and DX and DY is supposed as an affine transform matrix indicated in FIG. 19A and various transforms by use of this transform matrix are specified. For example,
<TAG_TRANSFORM_ISOTROPIC_SCALE> and <TAG_TRANSFORM_ANISOTROPIC_SCALE> for zooming in/out stroke data,
<TAG_TRANSFORM_ROTATE> for rotating stroke data,
<TAG_TRANSFORM_TRANSLATE> for translating stroke data, and
<TAG_TRANSFORM_ROTATE_AND_TRANSLATE> for rotating and then translating stroke data are available.

L. M. Mestetskii, "Fat Curves and Representation of Planar Figures," [online], 2000, Department of Information Technologies, Tver' State University, Tver, Russia, [Searched on Nov. 19, 2014], Internet <URL: http://cgm.cs.ntust.edu.tw/hlyang/www/Fat%20Curves.ppt> (Non-patent document 6) discloses an example of a drawing method for drawing natural lines on the basis of digital ink.

SUMMARY OF THE INVENTION

However, the transform rule by the mapping data illustrated in Non-Patent Document 1 and Non-Patent Document 2 mentioned above is for use in the geometric transform such as rotation and zoon-in of stroke data and therefore not placing a focus on the transform from input sensor attributes obtained from an input sensor, such as coordinate data included in stroke data and a writing pressure value, into drawing attribute data for use in drawing processing, such as line width and transparency. It would be advantageous in the ex-post-facto confirmation of input sensor capabilities used in generating stroke data, to indicate what input sensor attributes were used to produce drawing attribute data in stroke data, as opposed to indicating values of the drawing attribute data themselves.

Further, the description forms of prior-art transform rules are insufficient in describing the transform rules to the shading and width of lines drawn by actual pens or brushes. To be more specific, when lines are drawn on the paper by use of a pen filled with ink or a brush containing paint, a stroke is partially thinned or thickened by the blurring of ink or paint that is caused especially when a pen or a brush is moved on the paper at the start point or the end point. Depending on the above-mentioned description formats of prior-art transform rules, a description for providing a transform rule for applying a special transform rule to a part of a stroke cannot be executed or a transform rule for the variation of the value of a stroke input sensor attribute such as velocity cannot be described.

Therefore, the present invention addresses the above-identified and other problems associated with prior-art methods and apparatuses and solves the addressed problems by providing digital ink generating apparatus and a digital ink generating method configured to generate a digital ink that allows the description of transform rules for reproducing handwriting in which, while the value of input sensor attributes such as a writing pressure obtained from an input sensor or the like is held, line width and/or transparency are changed based on the value of these input sensor attributes. A digital ink reproducing apparatus is also provided, which is configured to reproduce the digital ink generated by the above-described digital ink generating apparatus.

In carrying out the invention and according to a first aspect thereof, there is provided a digital ink generating apparatus. This digital ink generating apparatus includes a stroke data generating block configured to generate stroke data associated with an input sensor attribute on the basis of pen event data generated by an input sensor when an indicator is operated; a mapping data generating block configured to generate mapping data indicative of a transform rule for transforming a value of the input sensor attribute included in the stroke data to a value of one of line width and transparency; and a digital ink assembly block configured to output, in a predetermined data format, a digital ink including the stroke data and the mapping data.

In carrying out the invention and according to a second aspect thereof, the mapping data generating block in the first aspect of the present invention generates first mapping data that includes a first transform rule for transforming a value of the input sensor attribute to a value of one of line width and transparency and first range data indicative of a range to which the first transform rule is applied.

In carrying out the invention and according to a third aspect thereof, the stroke data generating block in the first aspect of the present invention generates stoke data including a plurality of pieces of point data associated with the input sensor attribute. The plurality of pieces of point data include first point data and second point data different from the first point data. On the basis of a statistical value of a value of a first attribute among the input sensor attributes included in the first point data and a value of the first attribute included in the second point data, the mapping data generating block generates mapping data that includes a transform rule for obtaining a value of one of line width and transparency of the second point data.

In carrying out the invention and according to a fourth aspect thereof, there is provided a digital ink reproducing apparatus. This digital ink reproducing apparatus is configured to extract the stroke data and the mapping data from the digital ink generated by the digital ink generating apparatus according to various embodiments of the invention; generate stoke data including a value of one of line width and transparency by applying the transform rule included in the mapping data to the value of the input sensor attribute included in the stroke data; and execute drawing processing on the generated stroke data.

In carrying out the invention and according to a fifth aspect thereof, there is provided a digital ink generating method that is executed by a computer having an input sensor. This digital ink generating method includes: generating stroke data associated with a first attribute on the basis of pen event data generated by the input sensor when an indicator is operated; generating mapping data indicative of a transform rule for transforming a value of the first attribute included in the stroke data to a value of one of the first attribute and a second attribute; and assembling a digital ink for outputting, in a predetermined data format, a digital ink that includes the stroke data and the mapping data.

According to the first aspect of the present invention, while holding values of input sensor attributes such as writing pressure data, a digital ink can be generated on the basis of these input sensor attribute values, which describes a transform rule for deriving values of drawing attributes of stroke data such as the line width and the transparency. Consequently, the present invention is useful, for example, when a user wishes to differentiate between whether the values of line width and transparency are the values derived from the writing pressure obtained by the input sensor or virtually derived from a velocity parameter, when the user wishes to change the correspondence between writing pressure and line width collectively ex-post facto, or when the user wishes to use a writing pressure value as a comparison parameter of signature authentication.

According to the second aspect of the present invention, a digital ink describing a rule for applying a transform rule in mapping data to a part of a range can be generated. Consequently, a configuration may be provided in which a transform rule is applied only to a part near the start of a stroke and a part near the end thereof. Thus, it becomes possible to describe a transform rule that can more realistically express, for example, special emphasis applied to end parts of a stroke, where the line width and the transparency are subject to variation in an actual stroke.

According to the third aspect of the present invention, mapping data can be generated that specifies a transform relation for obtaining the line width and the transparency by use of input sensor attribute values as an input. These input sensor attribute values are included in two or more pieces of point data having different index values. Consequently, in deriving attribute values for use in drawing of transparency and line width, transform rules based on a statistical value of differential values, integration values, or arithmetic mean can be applied. For example, transform rules for generating a digital ink simulating an actual ink state, such as a transform rule for increasing the transparency in accordance with the moving velocity of the indicator, can be described.

BRIEF DESCRIPTION OF THE DRAWINGS

FIG. 4 is a diagram illustrating pieces of stroke data shown in FIG. 3 that are generated in accordance with the format of InkML format;

FIG. 5 is a diagram with only stroke data corresponding to alphabet "e" extracted from the pieces of stroke data corresponding to five alphabets shown in FIG. 4;

FIG. 6 is a diagram illustrating digital ink that is assembled by a digital ink assembly block shown in FIG. 2;

FIGS. 7A and 7B are diagrams illustrating various examples of contents of mapping data that is set by a user;

FIG. 8 is a diagram illustrating an example of mapping data compliant with the format of InkML;

FIG. 9A is a diagram illustrating a range of a stroke if range="-2, -1" is specified as an example of range data;

FIG. 9B is a diagram illustrating a range of a stroke if range="0, 1" is specified as an example of range data;

FIG. 9C is a diagram illustrating a range of a stroke if range="-1, 0" is specified as an example of range data;

FIG. 9D is a diagram illustrating a range of a stroke if range="1, -2" is specified as an example of range data;

FIG. 10 is a diagram illustrating drawing style information indicative of a brush style set in an application at the time of generating stroke data as an example of drawing style data;

FIG. 11A is a diagram illustrating the stroke data in a state in which it is extracted from the digital ink by a digital ink generating block;

FIG. 11B is a diagram illustrating the stroke data after application of mapping data;

FIG. 11C is a diagram illustrating the stroke data after application of another mapping data;

FIG. 16A is a diagram illustrating the stroke data in a state in which it is extracted from digital ink by a digital ink reproducing block;

FIG. 16B is a diagram illustrating the stroke data after application of mapping data to all parts of the stroke;

FIG. 16C is a diagram illustrating the stroke data after application of the mapping data to part of range data="-3, -1";

FIGS. 17A-17C are diagrams illustrating the stroke data of the second embodiment of the present invention;

FIG. 18 is a diagram illustrating effects of transform rules in which transparency increases in accordance with velocity;

FIG. 19A is a diagram illustrating a <mapping> element that is the mapping data described in Non-Patent Document 1; and FIG. 19B is a diagram illustrating transform rules using "mathml" as the type of the <mapping> element.

DETAILED DESCRIPTION OF THE PREFERRED EMBODIMENTS

The technology disclosed herein will be described in further detail by way of embodiments thereof with reference to the accompanying drawings.

First Embodiment

Figure 1:
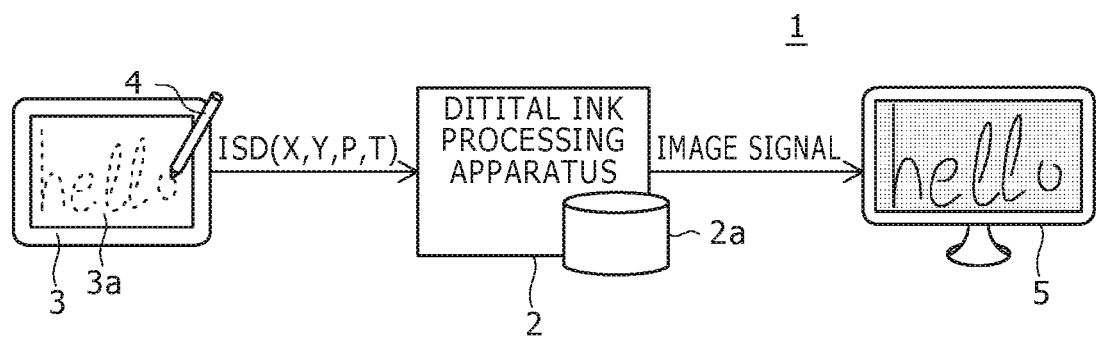
FIG. 1 is a diagram illustrating an input system of a first embodiment of the present invention.

Referring to FIG. 1, there is shown a diagram illustrating an input system 1 of the first embodiment of the present invention. The input system 1 has a digital ink processing apparatus 2 having a storage apparatus 2a, a digitizer 3 (position detection device) having a planar sensor 3a, an electronic pen 4 (an indicator), and a display 5. It should be noted that, for the indicator, a human finger or a simple plastic stick (a stylus) for example may be used in addition to the above-described electronic pen 4. Although FIG. 1 illustrates the digital ink processing apparatus 2, the digitizer 3, and the display 5 as separate units, part or all of these may be configured as a unitized apparatus (a tablet personal computer (PC) for example).

The input system 1 has a function of generating a digital ink of InkML format on the basis of coordinate data and the like entered by the user by drawing a character or a picture on the sensor 3a of the digitizer 3 by use of the electronic pen 4 and then storing the generated digital ink in the storage apparatus 2a and a function of generating an image signal from the stored digital ink and reproducing the generated image signal on the display 5.

Two or more linear conductors extending in x direction (one direction inside the surface of the sensor 3a) and two or more linear conductors extending in y direction (the direction orthogonal to the x direction inside the surface of the digitizer 3) are arranged on the surface of the sensor 3a in an equidistant manner. On the basis of a change in the potential of these linear conductors that is generated when the electronic pen 4 gets close to the surface of the sensor 3a, the digitizer 3 detects the coordinate data (X, Y) indicative of the position of the electronic pen 4 inside the surface of the sensor 3a.

The electronic pen 4 of one embodiment of the present invention is configured to detect writing pressure P at a predetermined time interval and transmit detected writing pressure P to the digitizer 3 from time to time.

The digitizer 3 is configured to detect the above-described coordinate data (X, Y) and writing pressure P. Then, the digitizer 3 generates the input sensor data ISD that is a set of the detected coordinate data (X, Y), corresponding writing pressure data P and time data T indicative of detected time and outputs the generated input sensor data ISD to the digital ink processing apparatus 2 from time to time as shown in FIG. 1 through an input-output (IO) block (not shown). Consequently, a sequence of the input sensor data ISD is supplied to the digital ink processing apparatus 2 at each sampling rate of the sensor 3a while the digitizer 3 is detecting the electronic pen 4.

The digital ink processing apparatus 2 is a personal computer, for example. The digital ink processing apparatus 2 has a configuration that ordinary computer has, such as a central processing unit (CPU) and a communication circuit, in addition to the storage apparatus 2a shown. The storage apparatus 2a is configured by a main storage apparatus such as a main memory and an auxiliary storage apparatus such as a hard disk unit. The functional blocks of the digital ink processing apparatus 2 shown in FIG. 2 are realized by the operation of the CPU of the digital ink processing apparatus 2 as instructed by programs stored in the storage apparatus 2a.

Figure 2:
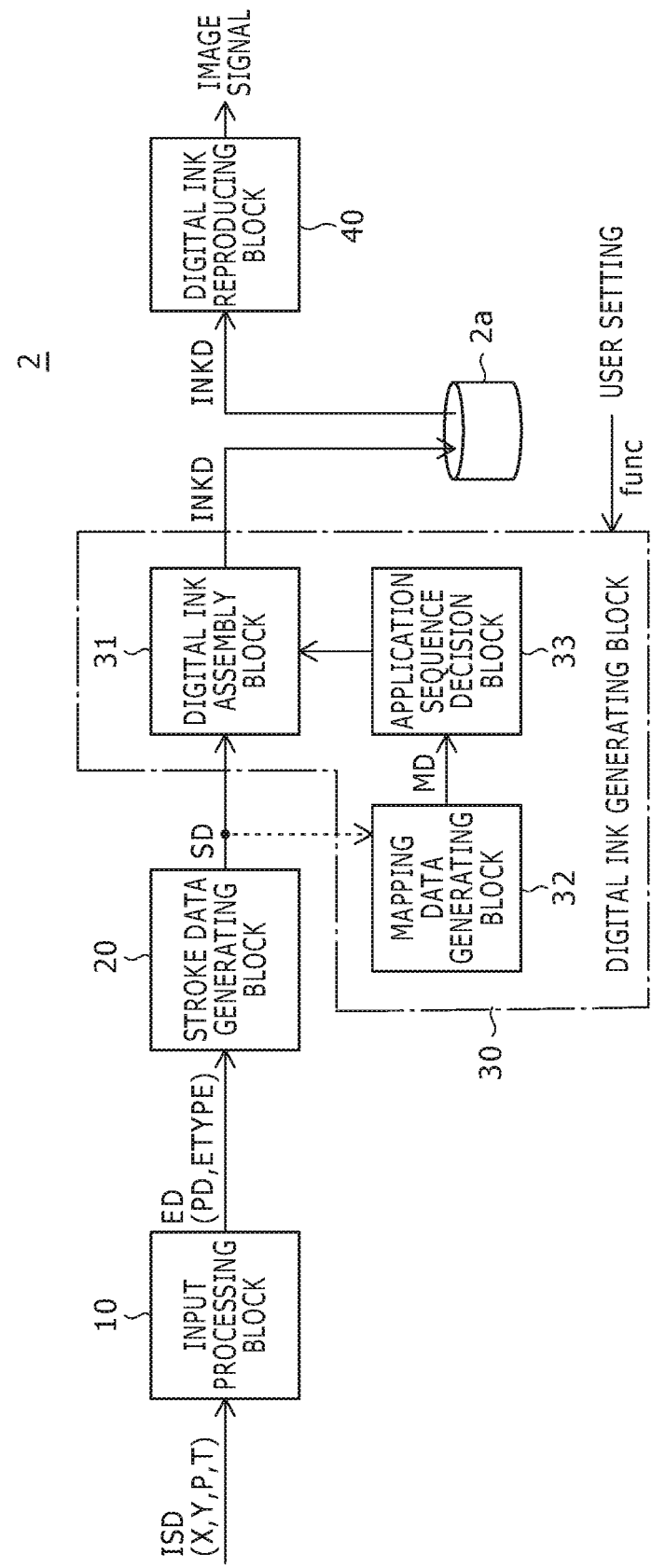
FIG. 2 is a functional block diagram illustrating a digital ink processing apparatus shown in FIG. 1.

Referring to FIG. 2, there is shown a functional block diagram illustrating the digital ink processing apparatus 2. As shown in the figure, the digital ink processing apparatus 2 is configured by an input processing block 10, a stroke data generating block 20, a digital ink generating block 30, and a digital ink reproducing block 40. Among these blocks, the digital ink generating block 30 is internally configured by a digital ink assembly block 31, a mapping data generating block 32, and an application sequence decision block 33.

The input processing block 10 extracts input sensor attributes ISA such as the coordinate data (X, Y) and the writing pressure data P from the input sensor data IDS supplied from the digitizer 3 through an interface such as universal serial bus (USB) or inter-integrated circuit (I2C) and converts the extracted attributes into event data ED that is format available for other programs operating in an operating system. Typically, the input processing block 10 is realized as a device driver corresponding to the digitizer 3 assembled in an operating system operating in the digital ink processing apparatus 2.

Here, the information included in the event data ED includes the event type identification information ETYPE for identifying which part of a sequence of strokes point data PD belongs to, in addition to the point data PD including the coordinate data (X, Y) and the writing pressure data P. Values of event type identification information ETYPE include a pen-down state Pdown, a pen-moved state Pmvd, and a pen-up state Pup. When detecting contact (pen-down) of an indicator such as the electronic pen 4 or a finger onto the digitizer 3, the input processing block 10 generates the point data PD including the coordinate data (X, Y) corresponding to the contact position and, at the same time, generates the event data ED as a value of event type identification information ETYPE set as the pen-down state Pdown. Next, while the indicator such as the electronic pen 4 is slid on the digitizer 3, the input processing block 10 continues generating a sequence of the point data PD corresponding to a sequence of the coordinate data (X, Y) and the event data ED with the value of pen-moved state Pmvd set to the value of event type identification information ETYPE. Finally, when detecting lift up (pen up) of the electronic pen 4 from the digitizer 3, the input processing block 10 generates the event data ED with the pen-up state Pup specified for the value of event type identification information ETYPE.

The stroke data generating block 20 is a functional block for receiving the event data ED from the input processing block 10 and generating stroke data SD (the first stroke data) including one or more point data PD. Typically, the stroke data generating block 20 is realized by a program called a library or a service that is executed by the CPU of the digital ink processing apparatus 2. The stroke data generating block 20 references the value of event type identification information ETYPE of event data ED supplied from the input processing block 10 and generates one stroke data SD including a sequence of point data PD included in the event data ED between the event data ED indicative of the pen-down state Pdown and the event data ED indicative of the pen-up state Pup. In addition to the case in which the value of coordinate data (X, Y) included in the input sensor data ISD is directly used as the value of coordinate data (X, Y) of point data PD, the stroke data generating block 20 may treat the value of new coordinate data (X, Y) obtained by executing smoothing processing or thinning out processing such as weighted average or exponential smoothing on the value of coordinate data (X, Y) included in the input sensor data ISD as the coordinate data (X, Y) of the point data PD, and may treat the coordinate data (X, Y) included in the input sensor data ISD and an additional control point for deciding the shape of an interpolation curve such as a Bezier curve as the point data PD.

Figure 3:
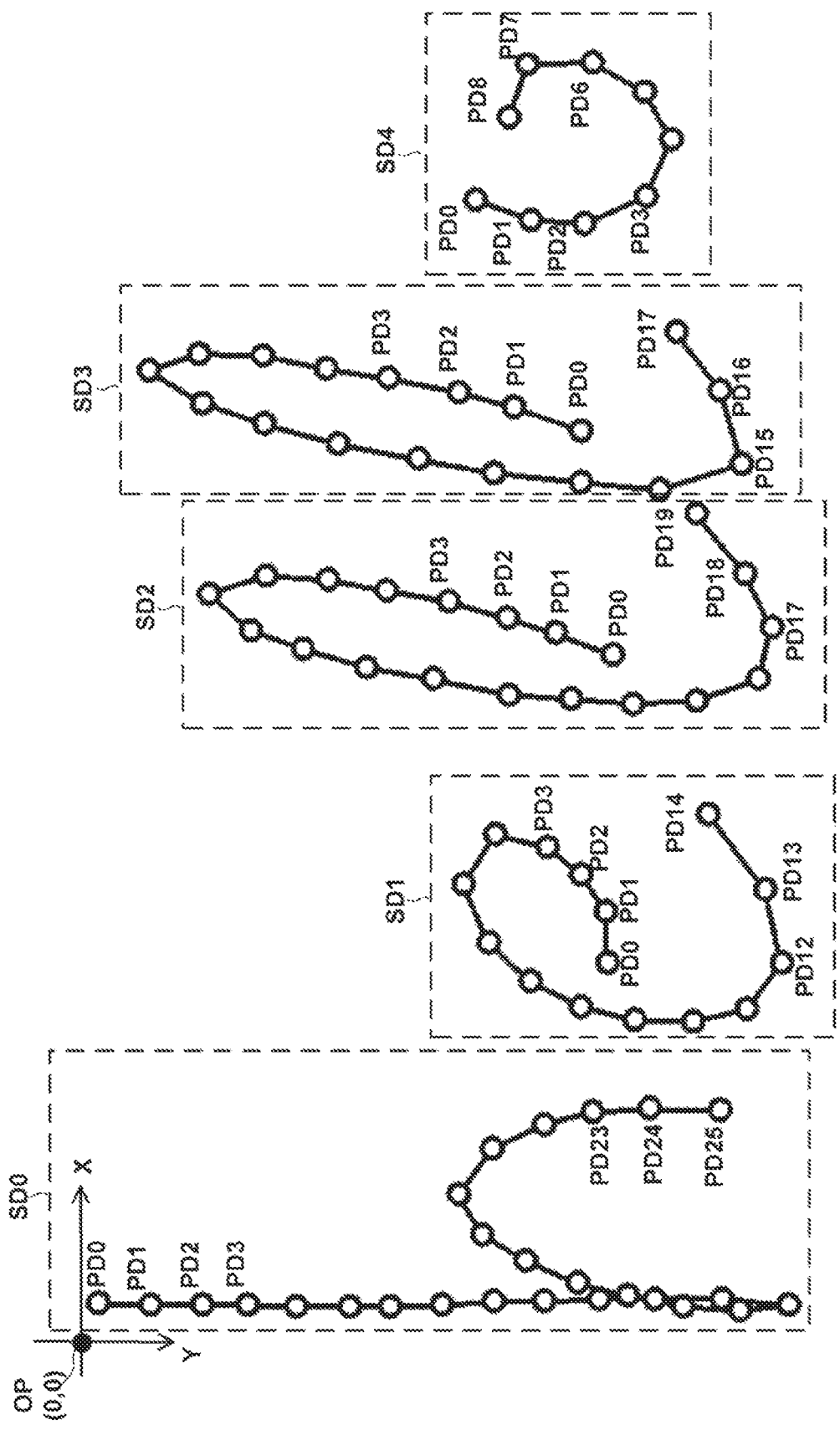
FIG. 3 is a diagram for describing a relation between point data and stroke data.

Referring to FIG. 3, there is shown a diagram illustrating a relation between the point data PD and the stroke data SD. In the figure, five dashed line frames are indicative of five pieces of stroke data SD (SD0, SD1, SD2, SD3, and SD4) that are generated when five alphabets "h," "e," "1," "1," and "o" are input.

Each of pieces of stroke data SD0 through SD4 includes a sequence of point data PD indicated by a white dot in the figure. In the figure, the solid lines between white dots indicate that the point data PD indicated by the white dots is sequential (or continuous).

The stroke data SD0 corresponding to the alphabet "h" includes 26 pieces of point data (the number n of pieces of point data=26) PD0 through PD25 starting with the point data PD0 with the index value of 0 and ending with PD25 with the index value of 25. The stroke data SD1 corresponding to the alphabet "e" includes 15 pieces of point data (the number n of pieces of point data=15) PD0 through PD14 starting with the point data PD0 with the index value of 0 and ending with PD14 with the index value of 14. The stroke data SD4 corresponding to the alphabet "o" includes 9 pieces of point data (the number n of pieces of point data=9) PD0 through PD8 starting with the point data PD0 with the index value of 0 and ending with PD8 with the index value of 8. Thus, the values of the number n of pieces of point data PD included in the stroke data SD are different from each other.

It should be noted that OP shown in FIG. 3 is indicative of the origin coordinate of the coordinate system of coordinate data (X, Y) included in the point data PD. In the following, it is assumed that the value of X coordinate increases in the right direction and the value of Y coordinate increases in the down direction for the convenience of description.

The stroke data generating block 20 of the present embodiment generates the stroke data SD in accordance with a description format of <trace> element in accordance with a format using InkML of Non-Patent Document 1 as the format of stroke data SD.

Referring to FIG. 4, there is shown the pieces of stroke data SD0 through SD4 that are generated in accordance with the format of InkML format. Referring to FIG. 5, there is shown only the stroke data SD1 that corresponds to the alphabet "e" and is extracted from the pieces of stroke data SD0 through SD4 corresponding to the five alphabets shown in FIG. 4.

As illustrated in FIG. 4 and FIG. 5, the stroke data SD is expressed as the <trace> element and generated in a format in which the pieces of point data PD0 through PD14 are delimited from each other with comma (,) delimiters at the end of each PD.

Inside each point data PD, the attribute data is delimited with one or more half-width spaces used as the delimiters. In the present embodiment, three attribute data, the first attribute (coordinate data X), the second attribute (coordinate data Y), and the third attribute (writing pressure data P) that are the input sensor attributes ISA are stored as the values of the original data.

These values of three input sensor attributes ISA are arranged inside each point data PD in the order of coordinate data X, coordinate data Y, and writing pressure data P. For example, as for the first point data PD0 that is the index value 0 in the stroke data SD1 shown in FIG. 5, "199" on the left side represents the coordinate data X, "306" represents the coordinate data Y, and "1.0" represents the writing pressure data P.

Returning to FIG. 2, the stroke data SD generated by the stroke data generating block 20 is supplied to the digital ink assembly block 31. The digital ink assembly block 31 is configured to assemble digital ink INKD on the basis of stroke data SD thus supplied and one or more mapping data MD supplied from the application sequence decision block 33.

Referring to FIG. 6, there is shown a diagram illustrating the digital ink INKD that is assembled by the digital ink assembly block 31. In the example shown in the figure, the digital ink INKD is generated in accordance with the format of InkML.

The digital ink INKD is configured by XML declaration starting with "<?xml" and <ink> element described from the row starting with "<ink . . . >" to the end row </ink>.

<ink> element is configured by a definition block DEB (<definitions> element) and a stroke data description SDB (<strokedataSD> element).

The definition block DEB is configured by a mapping data description block MDB and a drawing style data description block DDB.

The mapping data description block MDB is a block in which the mapping data MD indicative of a stroke data transform rule is described. For a transform rule, contents func of a transform rule is described, by which the value of input sensor attribute ISA included in the stroke data SD described in the stroke data description block SDB, which is the value of the data before transform, is transformed to the value of attribute of new drawing attribute DA such as a line width or shade.

The drawing style data description block DDB is a block for describing a drawing style indicative of a basic style when drawing the stroke data SD such as the shape of a pen point.

The stroke data description block SDB is a block in which the stroke data SD is described. Two or more pieces of stroke data SD such as the stroke data SD0 through the stroke data SD4 shown in FIG. 4 are listed.

Returning to FIG. 2, the mapping data generating block 32 is a functional block for generating mapping data MD indicative of a transform rule for transforming the input sensor attribute ISA included in the stroke data SD into the drawing attribute DA and outputting the generated mapping data MD. It should be noted that the drawing attribute DA is configured by any one of a line width W and a shade value (transparency A). Further, the mapping data MD generated by the mapping data generating block 32 includes range data rd (to be described later) indicative of an application range of a transform rule.

The contents func of a transform rule of mapping data MD generated by the mapping data generating block 32 is specified by user setting in advance.

Referring to FIG. 7, there are shown examples of contents func of the mapping data set by the user. FIG. 7A shows an example of a transform rule for outputting a value of drawing attribute DA that is the line width W as a value after transform, with writing pressure value P being a value before transform of the input sensor attribute ISA. In the figure, a function indicated by func1 is a transform rule in which the line width W is a value 10 times as large as the writing pressure value P taking a value between 0.0 and 1.0. In the figure, a function indicated by func2a is a transform rule in which the line width W is a value five times as large as the writing pressure value P taking a value between 0.0 and 1.0. In the figure, a function indicated by func2b is a transform rule in which the line width W is a value 20 times as large as writing pressure value P taking a value between 0.0 and 1.0.

FIG. 7B shows an example of a transform rule for outputting a value of drawing attribute DA that is the transparency A as a value after transform, wherein velocity V that is derived on the basis of coordinate data (X, Y) and time T is a value before transform. In the figure, functions indicated by func3 and func3b are indicative of transform rules in which transparency monotonously increases as the velocity V increases.

Each transform rule can be specified by the user without condition. A function func2c that does not pass the origin and the nonlinear function func3b are also available as functions of transform rules of mapping data MD.

The following describes in detail the mapping data MD generated by the mapping data generating block 32 with reference to FIG. 8. FIG. 8 shows an example of mapping data MD in compliance with the format of InkML. As shown in FIG. 8, the mapping data generating block 32 of the present embodiment is configured to generate two pieces of mapping data MD1 and MD2.

First, the mapping data MD1 (the first mapping data) is described.

Row 5 and row 6 in FIG. 8 are indicative of a transform rule (the first transform rule) for transforming the writing pressure data P (source="P") into line width data W (target="W"). Row 7 shows that expression is made by use of MathML described before. Rows 9 through 11 are indicative of the contents func1 of a transform rule shown in FIG. 7A for generating the line width data W by multiplying the writing pressure data P (represented by variable p), which is a source, by 10 (<times/>). It should be noted that the application range of the transform rule by this function func1 is all of the stroke data SD, so that the data of the application range of a transform rule is not included.

Next, the mapping data MD2 (the second mapping data) is described. Row 19 and row 20 shown in FIG. 8 indicate that the mapping data MD2 is a transform rule (the second transform rule) for transforming the writing pressure data P (source="P") into the line width data W (target="W"). Row 23 through row 25 are indicative of the contents func2a of the transform rule shown in FIG. 7A for generating the line width data W by multiplying the writing pressure data P (represented by the variable p), which is a source, by value 5 (<times/>). "range" on row 18 is indicative of the existence of range data rd (the first range data) indicative of the application range of a transform rule by this function func2a and an example ("−2, −1") of this range. Here, "−2" on the left side is indicative of the start point of the range and "−1" is indicative of the end point of the range.

The following describes a description method of the range data rd in detail. Here, suppose that an index value starting with 0 is attached to each point data PD in the stroke data SD. In order to indicate the range of stroke data SD, the range data rd uses index value information indicative of the index value of this point data PD. To be more specific, the index value information is the index value itself or a modified index value obtained by modifying the index value by an arithmetic rule based on a residue operation.

The arithmetic rule is expressed by equation (1) and equation (2) that follow. It should be noted that "i" is an index value before modification, "j" is a modified index value, and "n" is the number of pieces of point data PD in the stroke data SD (for example, n=15 for the stroke data SD1 shown in FIG. 3). Further, mod(a, b) is a function for obtaining a residue obtained when "a" is divided by "b." As seen from the equation (1), the modified index value j is an integer congruent to the corresponding index value i modulo the number n of point data.

$$j = \mathrm{mod}(i, n) - n \quad (1)$$

The modified index value j calculated by the equation (1) takes negative values that are lower by one, like "−1," "−2," "−3," . . . , sequentially from the last index value (the modified index value j of n-th point data PD) regardless of the total number n of point data PD. On the other hand, the index values are all positive. Therefore, determining whether the index value information included in the range data rd is positive or negative leads to determination of whether that index value information is an index value or a modified index value.

FIG. 9A through FIG. 9D illustrate four examples of range data rd and stroke ranges (end parts) in the stroke data SD0, the stroke data SD1, and the stroke data SD4. In each figure, each dashed-line frame indicates the range of each stroke corresponding to the range data rd.

FIG. 9A illustrates a stroke range with range="−2, −1" specified for an example of range data rd. For the stroke data SD0, SD1, and SD4 having different number n of pieces of point data, a range from the second from the last point data PD to the last point data PD, which is the end part of the tail, can be indicated by the same modified index value for any one of the pieces of stroke data.

FIG. 9B illustrates a stroke range with range="0, 1" specified for an example of range data rd. For the pieces of stroke data SD0, SD1, and SD4 having different number n of pieces of point data, a range of a part from the first point data PD to the second point data PD, at the beginning part, can be indicated by the same expression "0, 1".

FIG. 9C illustrates a stroke range with range="−1, 0" specified for an example of range data rd. For the pieces of stroke data SD0, SD1, and SD4 having different number n of pieces of point data, a range including two end parts can be indicated by one expression. This effect is obtained by addressing the point data PD included in the stroke data SD by the index value and the modified index value. This is especially advantageous when special processing is required for both ends of a stroke.

FIG. 9D illustrates a stroke range with range="1, −2" specified for an example of range data rd.

As described above, use of the index value information including the modified index value j using residue values in the description of range data provides the following advantages.

First, a range of end parts of all the stroke data SD0 through SD4 can be specified regardless of the total number n of pieces of point data PD of each stroke data SD0 through SD4. This means that the stroke data SD need not be referenced before generating the mapping data MD in specifying the end parts of strokes. Therefore, even with an application (e.g., an application sharing a drawing area amongst multiple users in real time), in which new stroke data SD continues to be generated even after mapping data MD is generated, the mapping data MD can be generated, in advance, independently of the stroke data SD.

In addition, use of a modified index value calculated by use of a residue allows handling of the stroke data SD as annular data in which the point data PDn at the end, to which the modified index value −1 is given, is continuous to the point data PD0 at the head, to which the index value 0 is given. Consequently, deformation (or adjustment) to be applied to both ends of stroke data, at which the line width and the shade of ink data are subject to much variation, can be indicated by one piece of range data rd.

To specify the index of halfway point data PD for each individual stroke data SD, such as the point data PD located at the center, the stroke data SD may be supplied to the mapping data generating block 32 as shown by a dashed-line arrow shown in FIG. 2. Consequently, the mapping data generating block 32 can determine the index value of the point data PD, which is the object of the transform rule, to thereby include the index value in the corresponding range data.

Returning to FIG. 2, one or more pieces of mapping data MD generated by the mapping data generating block 32 are supplied to the application sequence decision block 33. If two or more pieces of mapping data MD are supplied from the mapping data generating block 32, the application sequence decision block 33 determines the application sequence (application order) thereof.

For example, in the example shown in FIG. 8, assume that the mapping data MD1 is applied after the application of mapping data MD2, then, the application result of mapping data MD2 (applied to the range="−2, −1") gets canceled when the mapping data MD1 is applied to the pieces of point data PD0 through PDn of all index values included in the pieces of stroke data SD0 through SD4. On the contrary, assume that the mapping data MD2 is applied after the application of mapping data MD1, then, after the line width data W is generated for the pieces of point data PD0 through PDn of all index values included in the stroke data SD based on the mapping data MD1, only the line width data W corresponding to the point data PD of the index values of one part (the first end part, both end parts, etc.) is modified based on the mapping data MD2, such that only this partial line width data W is overwritten (to be described later with reference to FIG. 11).

Thus, if one digital ink INKD includes two or more pieces of mapping data MD, then results depend on the application sequence of these pieces of mapping data, so that it is required to determine the application sequence in advance. To be more specific, if there are two pieces of mapping data MD configured to transform the same input sensor attribute data (e.g., pressure, velocity) to the same drawing attribute data (e.g., line width, transparency) and an overlapping range exists, then the application sequence decision block 33 may decide the application sequence of these pieces of mapping data MD in accordance with the user setting to first apply the mapping data MD1 for all of stroke data SD and then overwrite a part of the resulting stroke data SD with the mapping data MD2, for example. By doing so, the drawing attribute data (the line width data W in the example shown in FIG. 8) as intended by the user can be obtained.

The digital ink assembly block 31 arranges the stroke data SD supplied from the stroke data generating block 20 into the stroke data description block SDB shown in FIG. 6.

In addition, the digital ink assembly block 31 arranges one or more pieces of mapping data MD supplied from the application sequence decision block 33 into the mapping data description block MDB shown in FIG. 6. In this case, if two or more pieces of mapping data MD are supplied from the application sequence decision block 33, the digital ink assembly block 31 decides the arrangement sequence of these two or more pieces of mapping data MD on the basis of the application sequence decided by the application sequence decision block 33. A specific arrangement sequence depends on the specification of the digital ink reproducing block 40 to be described later, which arranges the mapping data MD (the mapping data MD1 in the example shown in FIG. 8) to be applied earlier, ahead of the mapping data MD (the mapping data MD2 in the example shown in FIG. 8) to be applied later. Thus, when the digital ink reproducing block 40 interprets the digital ink INKD arranged in such sequence, the transform rules are applied in the order of mapping data MD1, MD2 through MDm from the head of the data, to thereby make the application sequence at reproduction the same as the application sequence determined by the application sequence decision block 33.

Further, the digital ink assembly block 31 adds drawing style data DD, in which a style related with the format of stroke data SD is described, to the setting data description block DDB.

Referring to FIG. 10, there is shown drawing style information DD1, as an example of the drawing style data DD, being indicative of the style of a brush, which is set in the application at the time of generation of stoke data SD.

As described above, the digital ink assembly block 31 combines the stroke data SD, the mapping data MD, and the drawing style data DD into an XML document, thereby assembling the digital ink INKD in conformity to the format of InkML.

It should be noted that the digital ink assembly block 31 outputs the digital ink INKD thus assembled to the storage apparatus 2a shown in FIG. 1 or network media as an XML file obtained by putting the digital ink INKD into a byte string based on an XML file coding method (UTF8 or the like) declared at the starting row shown in FIG. 6. Thus, the digital ink processing apparatus 2 of the present embodiment outputs the digital ink INKD.

<Digital Ink Reproducing Processing>

The following describes digital ink reproducing processing.

The digital ink reproducing block 40 shown in FIG. 2 is a functional block for playing the role of reproducing the digital ink INKD generated by the digital ink generating block 30 in the digital ink processing apparatus 2.

The processing that is executed by the digital ink reproducing block 40 includes extracting of stroke data SD (the first stroke data) and mapping data MD from the digital ink INKD and generating modified stroke data SD (the second stroke data) including a value of drawing attribute DA by applying the extracted mapping data MD to the input sensor attribute ISA included in the extracted stroke data SD.

The following specifically describes the above-described digital ink reproducing processing with reference to FIG. 11A through FIG. 11C. In what follows, it is assumed that the digital ink INKD subject to processing include the mapping data description block MDB shown in FIG. 8.

FIG. 11A shows the stroke data SD1 in a state of having been extracted from the digital ink INKD by the digital ink reproducing block 40. The stroke data SD1 includes three pieces of attribute data as the input sensor attributes ISA, i.e., first attribute data X indicative of X coordinate, second attribute data Y indicative of Y coordinate, and third attribute data P indicative of a writing pressure value.

The digital ink reproducing block 40 sequentially extracts the mapping data MD1 and MD2 shown in FIG. 8 from the mapping data description block MDB in the digital ink INKD shown in FIG. 6.

Of the two extracted mapping data MD1 and MD2, the digital ink reproducing block 40 first applies the first extracted mapping data MD1 to the stroke data SD1.

Consequently, as shown in FIG. 11B, stroke data SD1 after the application of mapping data MD1 is obtained. The stroke data SD after application of MD1 includes a value of line width W that is a new drawing attribute DA as the fourth attribute data in addition to the first through third attribute data X, Y, and P before transform.

It should be noted that the mapping data MD1 shown in FIG. 8 has no explicit description about the range data rd. If there is no explicit range specification, the digital ink reproducing block 40 executes the processing by assuming that the mapping data MD1 is to be applied to all strokes (the point data PD of all indexes included in the stroke data SD) in accordance with conventional <mapping> element rules. Consequently, with respect to the mapping data MD1 shown in FIG. 8, the transform rule is applied to all parts of stroke data SD. In FIG. 11B, a dashed-line frame indicated by rd1 is indicative of a range of strokes to which the transform rule related with the mapping data MD1 among the stroke data SD is applied. Further, values in the dashed-line frame indicated by rd1 are the values of line widths W obtained by the mapping data MD1 with func1 (multiplication by 10) shown in FIG. 7A being used as the transform rule.

As a result of the processing executed by the digital ink reproducing block 40 in accordance with the transform rule func1 in the mapping data MD1 shown in FIG. 8, as shown in FIG. 11B, the value of the fourth attribute data (line width W) in each point data PD is derived as a value ten times as great as the value of writing pressure data P in the stroke data SD after the application of mapping data MD1.

Next, the digital ink reproducing block 40 applies the mapping data MD2 shown in FIG. 8 to the range (part) of stroke data SD indicated by the range data rd described therein. It should be noted that the range data rd shown in FIG. 8 is "−2, −1" but FIG. 11C shows an example where the value of range data rd is "−1, −1." A dashed-line frame indicated by rd2 shown in FIG. 11C is indicative of a range to which the mapping data MD2 is applied if the value of range data rd is "−1, −1." Values in the dashed-line frame indicated by rd2 are indicative of the values of drawing attribute DA (the fourth attribute data) obtained by the mapping data MD2 with func2a (multiplication by 5) shown in FIG. 7A being used as the transform rule.

As for the point data PD14, comparison between a value "3" after the application of mapping data MD2 shown in FIG. 11C and a value "6" after the application of mapping data MD1 shown in FIG. 11B indicates that, in the stroke data SD after the application of mapping data MD2 (FIG. 11C), the value of line width W that is the fourth attribute data of the drawing attribute DA of the point data PD14 at a part (the last part) of the stroke is decreased. This corresponds, in the mapping data MD2, to the description of transforming the writing pressure data P to the line width data W by multiplying the writing pressure data P by 5 (instead of 10) and the description that the application range is only the last point data PD indicated by an index value −1.

The digital ink reproducing block 40, which has derived the drawing attribute DA from the value of input sensor attribute ISA to thereby generate the stroke data SD after transformation in the above described manner, generates an image signal by applying a known drawing processing method on the basis of other information such as the drawing style data DD described above.

Figures 12, 13A:
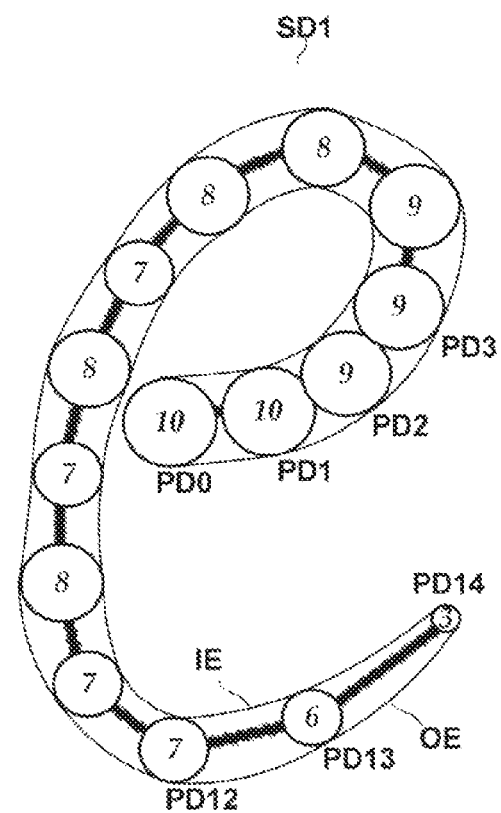
FIG. 12 is a diagram schematically illustrating an example of drawing processing described in Non-Patent Document 6.
FIG. 13A is a diagram illustrating an image signal reproduced from the stroke data obtained by applying a transform rule for obtaining line width by multiplying writing pressure by 10 onto all parts of the stroke data, for the pieces of stroke data shown in FIG. 3.

Referring to FIG. 12, there is shown a schematic diagram illustrating an example of drawing processing described in Non-Patent Document 6 as an example of a known drawing processing method. In the figure, white circles PD0 through PD14 are indicative of 15 pieces of point data PD included in the stroke data SD1. The numeric value in each circle is indicative of a value of the fourth attribute W for each piece of point data PD0 through PD14. In the figure, the radius of each while circle is indicated by a value in proportion to the value of the fourth attribute W. For example, point data PD0 is indicated by a circle having a diameter of 10 that is a value of the fourth attribute W and point data PD14 is indicated by a circle having a diameter of 3 that is a value of the fourth attribute (line width data W) obtained by the mapping data MD2.

The digital ink reproducing block 40 derives two envelopes (inside envelope IE and outside envelope OE) that touch each circle of the point data PD0 through PD14. The two envelopes IE and OE thus obtained define the contour of the shape of the stroke data SD1. Thus, for example, the digital ink reproducing block 40 can generate an image signal with the line width proportional to the line width data W as the line width of the stroke data. It should be noted that the drawing method for the stroke data SD after transform is not limited to one described above; any other drawing method is also available.

The image signal generated by the digital ink reproducing block 40 is outputted to the display 5 as shown in FIG. 1. Consequently, stroke data SD modified by the mapping data MD2 is displayed visible to the user for the stoke data SD0 through SD4.

FIG. 13A through FIG. 13D show image examples of the stroke data SD (stroke data SD0 through SD4) converted into an image signal as described above.

FIG. 13A is indicative of an image signal reproduced from the stroke data SD by applying the transform rule func1, for obtaining the line width W by multiplying the writing pressure P by 10, to all parts of the stroke data, for the stroke data SD0 through SD4 shown in FIG. 3.

Figure 13B:
FIG. 13B is a diagram illustrating an image signal reproduced from the stroke data obtained by (1) applying the transform rule for obtaining the line width by multiplying the writing pressure by 10 onto all parts of the stroke data and then (2) applying another transform rule for obtaining the line width by multiplying the writing pressure by 5 onto the end part indicated by dashed line frames in the figure of the stroke, for the pieces of stroke data shown in FIG. 3.

FIG. 13B shows an image signal reproduced from the stroke data SD obtained by (1) applying the transform rule func1, for obtaining the line width W by multiplying the writing pressure P by 10, to all parts of the stroke data and (2) by applying the transform rule func2a, for obtaining the line width W by multiplying the writing pressure P by 5, to the end parts indicated by dashed-line frames in the figure of the strokes, for the stroke data SD0 through SD4 shown in FIG. 3.

Figure 13C:
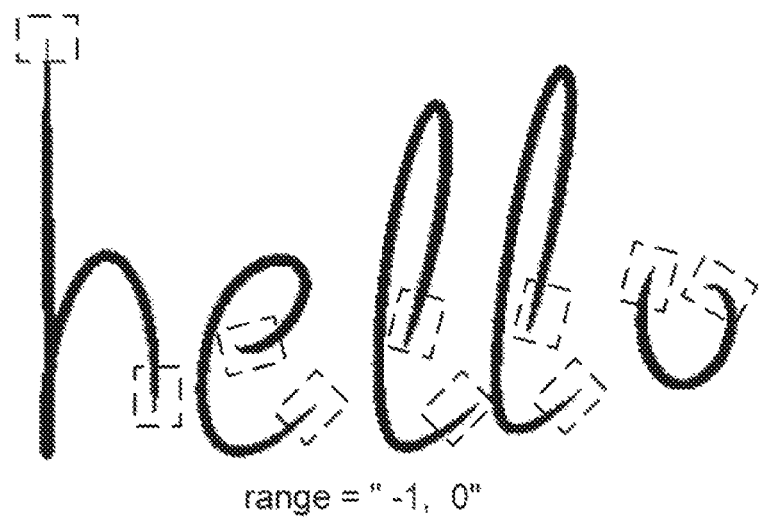
FIG. 13C is a diagram illustrating an image signal reproduced from the stroke data obtained by (1) applying the transform rule for obtaining the line width by multiplying the writing pressure by 10 onto all parts of the stroke data and then (2) applying the other transform rule for obtaining the line width by multiplying the writing pressure by 5 onto both parts of the end part and the start part indicated by dashed line frames in the figure of the stroke, for the pieces of stroke data shown in FIG. 3.

FIG. 13C shows an image signal reproduced from the stroke data SD obtained by (1) applying the transform rule func1, for obtaining the line width W by multiplying the writing pressure P by 10, to all parts of the stroke data and (2) by applying the transform rule func2a, for obtaining the line width W by multiplying the writing pressure P by 5, to both ends of the end and the start indicated by dashed-line frames in the figure of the strokes, for the stroke data SD0 through SD4 shown in FIG. 3.

Figures 13D, 14:
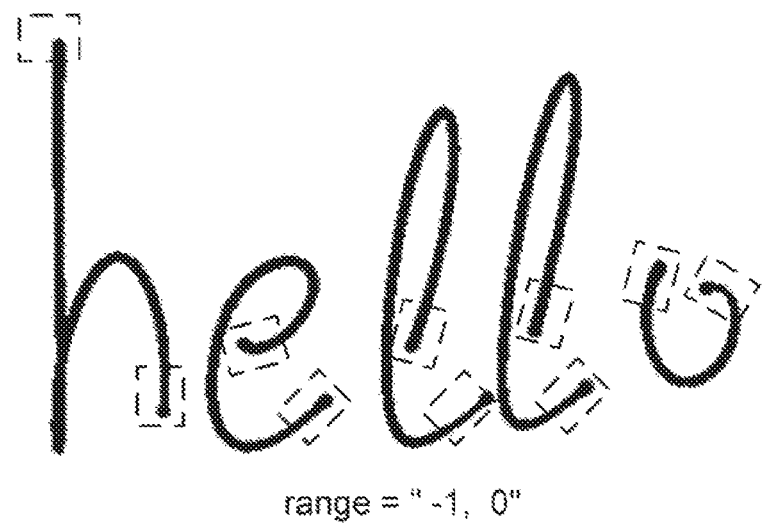
FIG. 13D is a diagram illustrating an image signal reproduced from the stroke data obtained by (1) applying the transform rule for obtaining the line width by multiplying the writing pressure by 10 onto all parts of the stroke data and then (2) applying a further transform rule for obtaining the line width by multiplying the writing pressure by 20 onto both parts of the end part and the start part indicated by dashed line frames in the figure of the stroke, for the pieces of stroke data shown in FIG. 3.
FIG. 14 is a diagram illustrating stroke data including 10 pieces of point data as an example of stroke data that is generated by a stroke data generating block of a second embodiment of the present invention.

FIG. 13D shows an image signal reproduced from the stroke data SD obtained by (1) applying the transform rule func1, for obtaining the line width W by multiplying the writing pressure P by 10, to all parts of the stroke data and (2) by applying the transform rule func2b, for obtaining the line width W by multiplying the writing pressure P by 20, to both end parts of the end and the start indicated by dashed-line frames in the figure of the strokes, for the stroke data SD0 through SD4 shown in FIG. 3.

As described above, according to the input system 1 (especially the digital ink generating block 30) of the present embodiment, the ink data INKD describing a transform rule for deriving the values of drawing attributes DA of stroke data, such as the line width W and the transparency A, can be generated without losing the data indicative of the input sensor attributes ISA, such as the writing pressure data and so on.

Consequently, the digital ink INKD can indicate how the values (the line width W and the transparency A) of drawing attributes DA were derived from what value of input sensor attributes ISA. Thus, the relations between the ISA (e.g., writing pressure data P) and the DA (e.g., line width W) included in the already generated digital ink INKD can be changed all at once. Further, the writing pressure data P stored in the digital ink INKD can be used as the comparison parameters for signature authentication, regardless of whether P is directly used in a drawing application.

Further, according to the generating method of digital ink INKD of the present embodiment, the digital ink INKD can describe rules for applying the transform rules in the mapping data MD to a partial range among all of the stroke data SD. Therefore, as with the examples described above, the digital ink INKD can also be configured such that the transform rules are applied only to the start and the end of stroke data SD, to thereby generate the digital ink INKD for the strokes having highly realistic appearance as illustrated in FIG. 13A through FIG. 13D. In addition, the end points of the range data are represented by use of index values and modified index values obtained by residue operations, so that the transform rules for specifying one end point or both end points (start and termination end points) can be obtained before the stroke data SD is generated.

Second Embodiment

The following describes an input system 1 of the second embodiment of the present invention. The system configuration of the input system 1 and functional blocks of a digital ink processing apparatus 2 of the second embodiment are substantially the same as those of the first embodiment of the present invention shown in FIG. 1 and FIG. 2.

The input system 1 of the second embodiment is different from the input system 1 of the first embodiment only in terms of the contents of stroke data SD outputted from a stroke data generating block 20 and the internal processing of a mapping data generating block 32 and a digital ink reproducing block 40. Thus, the same reference symbols are attached to the configurations similar to those of the first embodiment and the description thereof will be omitted. In the following, different points from the first embodiment will mainly be described.

The stroke data generating block 20 of the present embodiment generates stroke data SD that includes three types of input sensor attributes ISA, i.e., coordinate data X, coordinate data Y, and time data T. FIG. 14 shows stroke data SD5 that includes 10 pieces of point data PD0 through PD9 as an example of stroke data SD that is generated by the stroke data generating block 20 of the present embodiment.

As illustrated by the example shown in FIG. 14, also in the present embodiment, stroke data SD is generated in InkML format; to be more specific, stroke data SD is generated in a format in which each pieces of point data PD is delimited by a comma (,). In each pieces of point data PD, each piece of attribute data is delimited by a half-width space. The attribute data in the point data PD are arranged in the order of coordinate data X, coordinate data Y, and time data T. For example, as for the second point data PD1 in the example described above, "8" on the left side is coordinate data X, "0" at the center is coordinate data Y, and a right-side numeral 16 of "'16" on the right side is time data T. It should be noted that the time corresponding to the first index value is set to 0 millisecond and the time data T of each piece of point data PD represents elapsed time therefrom.

For the brevity of description, the example shown in FIG. 14 shows that coordinate data (X, Y) is obtained at a given interval of 16 milliseconds. Also with regard to the coordinate data (X, Y), this example shows the coordinates obtained when the Y coordinate is fixed to 0 and the electronic pen 4 is moved only in the X direction at constant acceleration (velocity of increase by 8 every 16 milliseconds).

The mapping data generating block 32 of the present embodiment is configured to generate mapping data MD that includes a transform rule for obtaining drawing attribute DA, which is transparency data A, on the basis of a value of first input sensor attribute ISA (for example, coordinate data (X, Y), or time data T) of a first piece of point data PDi in one piece of stroke data SD and a value of the first input sensor attribute ISA of a second piece of point data PDi+1 having a different index value from the first piece of point data PDi in the same piece of stroke data SD.

Figure 15:
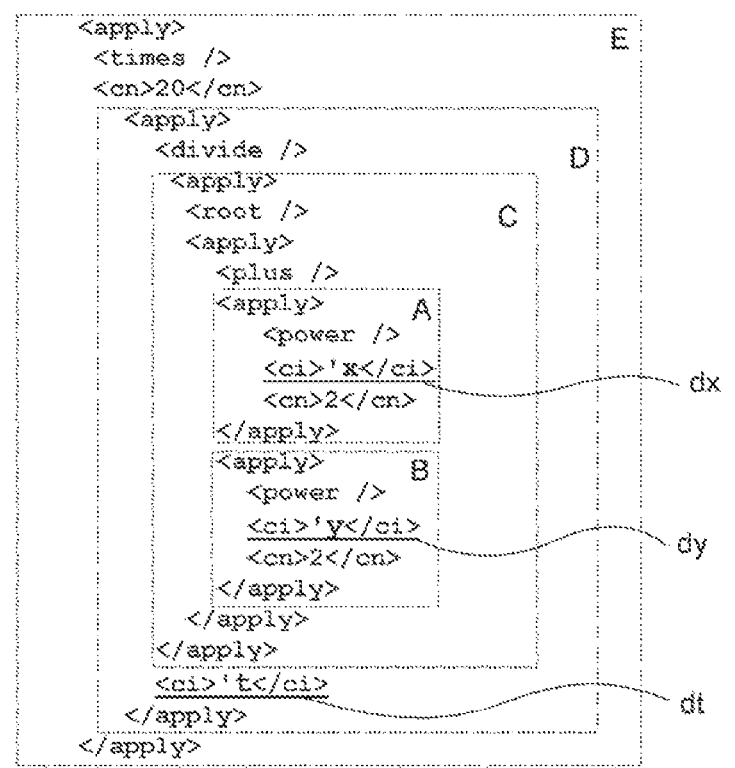
FIG. 15 is a diagram illustrating mapping data that is generated by a mapping data generating block of the second embodiment of the present invention.

The following describes in detail the mapping data MD that is generated by the mapping data generating block 32 of the present embodiment with reference to FIG. 15.

Referring to FIG. 15, there is shown mapping data MD3 that is generated by the mapping data generating block 32 of the present embodiment.

Row 3 through row 7 are parts that define input sensor attributes (X, Y, T), to which transform is applied, and a drawing attribute (transparency A), which results from the transform.

Row 11 through row 37 are parts indicative of transform rules included in the mapping data MD3. To be more specific, transform rules are described, according to which transparency data $A_i$ corresponding to the i-th index value is generated by the following equations (2) and (3). It should be noted that $X_i, X_{i-1}, Y_i, Y_{i-1}, T_i,$ and $T_{i-1}$ in equation (3) are indicative of coordinate data X corresponding to the i-th index value, coordinate data X corresponding to the (i−1)-th index value, coordinate data Y corresponding to the i-th index value, coordinate data Y corresponding to the (i−1)-th index value, time data T corresponding to the i-th index value, and time data T corresponding to the (i−1)-th index value, respectively.

$$A_i = 20 \cdot V_i \qquad (2)$$

$$V_i = \frac{\sqrt{(X_i - X_{i-1})^2 + (Y_i - Y_{i-1})^2}}{T_i - T_{i-1}} \qquad (3)$$

The transform rules by the equation (2) and the equation (3) described above are characterized in that, in generating the transparency data $A_i$ corresponding to the i-th index value, input sensor attribute data corresponding to an index value that is not the i-th is referenced. To be more specific, the input sensor attribute data corresponding to the index value i−1 preceding by one $(X_{i-1}, Y_{i-1}, T_{i-1})$ is referenced, in equation (3), to obtain $V_i$ that is indicative of the moving velocity of the electronic pen 4 moving from a position corresponding to the index value i−1 to a position corresponding to the index value i. Under the transform rule based on equation (2), a function is set such that, as the moving velocity $V_i$ increases, the transparency of the resulting "ink" trace increases (func3 shown in FIG. 7B).

The following describes a relation between the mapping data MD3 shown in FIG. 15 and the above-described equations (2) and (3). First, in FIG. 15, row 22 "'x" indicated by dx, row 27 "'y" indicated by dy, and row 32 "'t" indicated by dt denote "$X_i$-$X_{i-1}$," "$Y_i$-$Y_{i-1}$," and "$T_i$-$T_{i-1}$," respectively.

The portion enclosed by a dashed-line frame A shown in FIG. 15 is indicative of a value obtained by squaring "$X_i$-$X_{i-1}$" that is an amount of movement of X. The portion enclosed by a dashed-line frame B in the figure is indicative of a value obtained by squaring "$Y_i$-$Y_{i-1}$" that is an amount of movement of Y. The portion enclosed by a dashed-line frame C in the figure is indicative of an amount of movement within a two-dimensional plane corresponding to the right-side numerator of the equation (3). The portion enclosed by a dashed-line frame D corresponds to the entirety of the right side of the equation (3), thereby indicating the velocity of the interval of time "$T_i$-$T_{i-1}$." The portion enclosed by a dashed-line frame E corresponds to the right-side entirety (20-$V_i$) of the right side of the equation (2). Thus, the mapping data MD3 shown in FIG. 15 describes a transform rule, which transforms the input sensor attribute ISA indicated by the equation (2) and the equation (3) to the drawing attribute DA (transparency A).

As described above, the digital ink processing apparatus 2 of the present embodiment generates and outputs the digital ink INKD including the mapping data MD3.

The following describes digital ink reproducing processing in the present embodiment with reference to FIG. 16A through FIG. 16C.

First, the digital ink reproducing block 40 extracts the stroke data SD5 and the mapping data MD3 from the digital ink INKD.

FIG. 16A shows the stroke data SD5 as a transform source that the digital ink reproducing block 40 extracted from the digital ink INKD. As described with reference to FIG. 14, the stroke data SD5 includes, as the input sensor attributes ISA, three pieces of data, i.e., first attribute data X indicative of X coordinate, second attribute data Y indicative of Y coordinate, and third attribute data T indicative of time information.

Next, the digital ink reproducing block 40 that has obtained the digital ink INKD applies the extracted mapping data MD3 to the extracted stroke data SD5. FIG. 16B is indicative of the stroke data SD5 obtained by the application of mapping data MD3. The stroke data SD5 at this point of time includes the transparency data A that is the fourth attribute (drawing attribute DA) derived from the input sensor attributes ISA. It should be noted that, depending on equations (2) and (3) described above, transparency data $A_0$ corresponding to the first index value cannot be obtained. Thus, the digital ink reproducing block 40 sets the value of transparency data $A_1$ "10" as a value of transparency data $A_0$ as a matter of convenience.

FIG. 16C is indicative of the stoke data SD that is obtained if the transform rule func3 is applied not to the entire stroke but to a part of range data rd="-3, -1." This example shows only three pieces of transparency data A from the end of the stroke are obtained and a transparency default value of "0", which is used when a transparency value is unobtainable, is set for the rest of the point data PD.

As described above, in the digital ink reproducing processing of the present embodiment, the stroke data SD can be obtained which includes the transparency A obtained by the transform rule.

Thus, based on that the drawing attribute DA are derived from the values of input sensor attribute ISA, the digital ink reproducing block 40 generates the post-transform stroke data SD and generates an image signal by applying a known drawing processing method using other information such as the drawing style data DD described above.

FIG. 17A through FIG. 17C include diagrams for describing the stoke data SD of the present embodiment.

FIG. 17A is indicative of positional relations between ten pieces of coordinate data (X, Y) of the point data PD0 through PD9 included in the stroke data SD5 shown in FIG. 14.

FIG. 17B is an image diagram illustrating an image signal that is generated based on the stroke data SD5 obtained by representing each piece of point data PD0 through PD9 in a black circle and setting a value of transparency A shown in FIG. 16B as the transparency A in each black circle. According to the transform setting of the illustrated embodiment, as an amount of movement per time or the moving velocity V increases, the transparency A increases. This allows for reproducing a state in which an amount of ink absorbed in the paper per unit time decreases, to thereby reproduce strokes having more realistic appearance.

FIG. 17C is an image diagram illustrating an image signal that is generated based on the stroke data SD5 obtained by representing each piece of point data PD0 through PD9 in a black circuit and setting a value of transparency A shown in FIG. 16C as the transparency A in each black circle. In the stroke, the transform rule func3 is applied only to the range of three end parts, to thereby reproduce an image representative of an accelerating movement of a human hand, such as in a sweeping stroke used to draw a kanji (Chinese) character.

Referring to FIG. 18 there is shown another diagram illustrating effects of the transform rule, by which the transparency A increases in accordance with the velocity V. Image signals are shown in which, if data of a felt pen or the like is applied as the brush type that is set in the drawing style information DD1 (refer to FIG. 6 and FIG. 10), the transparency A increases as the moving velocity (speed) of the indicator increases from the left to the right in the figure as with the stroke data SD5 shown in FIG. 17A through FIG. 17C.

As described above, according to the digital ink processing apparatus 2 of the present embodiment, the mapping data MD can be generated, which specifies the transform relations used to obtain the drawing attributes DA based on, as an input, the values of input sensor attributes ISA included in two or more pieces of point data PD having different index values. Consequently, even from the digital ink generated by an input sensor not capable of outputting the input sensor attributes ISA such as the writing pressure data P, the drawing attributes DA such as the line width W and the transparency A can be derived. Further, the type of original data used to derive the drawing attributes DA, such as the transparency A and the line width W, can be recorded (e.g., whether the writing pressure data is included in the original data, or the writing pressure data is not included in the original data and instead derived from the velocity or the like included in the original data, can be recorded).

In addition, in deriving the drawing attributes DA such as the transparency A and the line width W, it is possible to describe the transform rules based on a statistical value, such as differential values (derivatives), integration values, or arithmetic means of the (same) input sensor attributes ISA (coordinate values). For example, a transform rule can be described, by which the transparency A increases as the moving velocity increases, using a statistical value.

While the preferred embodiments of the present invention have been described using specific terms, such description is for illustrative purposes only, and it is to be understood that changes and variations may be made without departing from the spirit or scope of the following claims.

For example, the first embodiment and the second embodiment may be combined to obtain a digital ink having highly realistic expression capabilities in terms of both thickness (as represented by the line width W) and shade (as represented by the transparency A). In this case, both the writing pressure data P and the time data T may be included in each piece of point data PD making up the stroke data SD, and both the mapping data MD for transforming the writing pressure data P to the line width data W (the first embodiment) and the mapping data MD for obtaining the transparency data A from the brush operating speed (the second embodiment) may be included in the digital ink INKD.

It should be noted that a transform rule to be applied to a range specified by range data in the first embodiment need not be for deriving the drawing attributes DA, such as the line width W and the transparency A, from the input sensor attributes ISA. Rather, the range may be used to deform only a portion of the geometrical shape of a stroke by use of the conventional affine transform method.

It should also be noted that, in the second embodiment, the attributes obtained by transform rules that use a statistical value of the same input sensor attributes ISA are not limited to the drawing attributes DA, such as the line width W and the transparency A. For example, the coordinate data of point data PD used for actual drawing may be obtained, by applying a transform rule such as an arithmetic mean, based on the coordinate data included in the stroke data SD as the original data.

It should further be apparent to those skilled in the art that the invention can be embodied as a method of sequentially executing the processing of the stroke data generating block 20 and the digital ink generating block 30 by use of a computer, or as a computer-readable tangible medium including a computer program which, in operation, causes a computer to execute the above-described processing.

What is claimed is:

1. A digital ink reproducing apparatus comprising:
a processor; and
a memory storing instructions that, when executed by the processor, cause the processor to:
extract coordinate or writing pressure data included in digital ink, the digital ink including (1) the coordinate or writing pressure data and (2) a transform rule for transforming the coordinate or writing pressure to a line width or transparency data, wherein the transform rule is associated with the coordinate or writing pressure data in the digital ink;
extract the transform rule included in the digital ink; and
transform the extracted coordinate or writing pressure data into a line width or transparency data based on the extracted transform rule,
wherein the transform rule includes a first transform rule and a second transform rule, and the second rule is different from the first transform rule, and
wherein the first transform rule is applied to both or one of a starting end part and a terminal end part of a stroke, and the second transform rule is applied to a part different from the both or one of the starting end part and the terminal end part of the stroke.

2. The digital ink reproducing apparatus according to claim 1,
wherein a data format of the digital ink is an Ink Markup Language (InkML) format and the transform rule is described using a mapping element specified by the InkML format.

3. The digital ink reproducing apparatus according to claim 1,
wherein the transform rule defines a relation in which, as a moving velocity of the indicator derived based on the coordinate data increases, a value of the transparency data increases.

4. The digital ink reproducing apparatus according to claim 1,
wherein the transform rule is settable by a user.

5. The digital ink reproducing apparatus according to claim 1,
wherein the digital ink is a file stored in a storage device.

6. A method performed by a digital ink reproducing apparatus, the method comprising:
extracting coordinate or writing pressure data included in digital ink, the digital ink including (1) the coordinate or writing pressure data and (2) a transform rule for transforming the coordinate or writing pressure to a line width or transparency data, wherein the transform rule is associated with the coordinate or writing pressure data in the digital ink;
extracting the transform rule included in the digital ink; and
transforming the extracted coordinate or writing pressure data into a line width or transparency data based on the extracted transform rule,
wherein the transform rule includes a first transform rule and a second transform rule, and the second rule is different from the first transform rule, and
wherein the first transform rule is applied to both or one of a starting end part and a terminal end part of a stroke, and the second transform rule is applied to a part different from the both or one of the starting end part and the terminal end part of the stroke.

7. The method according to claim 6,
wherein a data format of the digital ink is an Ink Markup Language (InkML) format and the transform rule is described using a mapping element specified by the InkML format.

8. The method according to claim 6,
wherein the transform rule defines a relation in which, as a moving velocity of the indicator derived based on the coordinate data increases, a value of the transparency data increases.

9. The method according to claim 6,
wherein the transform rule is settable by a user.

10. The method according to claim 6,
wherein the digital ink is a file stored in a storage device.

11. A non-transitory computer-readable medium storing instructions that, when executed by a processor, cause the processor to:
extract coordinate or writing pressure data included in digital ink, the digital ink including (1) the coordinate or writing pressure data and (2) a transform rule for transforming the coordinate or writing pressure to a line width or transparency data, wherein the transform rule is associated with the coordinate or writing pressure data in the digital ink;
extract the transform rule included in the digital ink; and
transform the extracted coordinate or writing pressure data into a line width or transparency data based on the extracted transform rule, wherein the transform rule includes a first transform rule and a second transform rule, and the second rule is different from the first transform rule, and wherein the first transform rule is applied to both or one of a starting end part and a terminal end part of a stroke, and the second transform rule is applied to a part different from the both or one of the starting end part and the terminal end part of the stroke.

12. The computer-readable medium according to claim 11, wherein a data format of the digital ink is an Ink Markup Language (InkML) format and the transform rule is described using a mapping element specified by the InkML format.

13. The computer-readable medium according to claim 11, wherein the transform rule defines a relation in which, as a moving velocity of the indicator derived based on the coordinate data increases, a value of the transparency data increases.

14. The computer-readable medium according to claim 11, wherein the transform rule is settable by a user.

15. The computer-readable medium according to claim 11, wherein the digital ink is a file stored in a storage device.

* * * * *